United States Patent
Jones et al.

(10) Patent No.: US 9,020,367 B2
(45) Date of Patent: Apr. 28, 2015

(54) OPTICAL CHIPS AND DEVICES FOR OPTICAL COMMUNICATIONS

(75) Inventors: Stephen Jones, Northamptonshire (GB); Robert Anthony Griffin, Towcester (GB); Paul Firth, Stoke Gabriel (GB); Adrian Perrin Janssen, Exeter (GB); Colin Smith, Paignton (GB)

(73) Assignee: Oclaro Technology Limited, Northamptonshire (GB)

( * ) Notice: Subject to any disclaimer, the term of this patent is extended or adjusted under 35 U.S.C. 154(b) by 374 days.

(21) Appl. No.: 13/202,088

(22) PCT Filed: Feb. 17, 2010

(86) PCT No.: PCT/IB2010/000303
§ 371 (c)(1),
(2), (4) Date: Jan. 17, 2012

(87) PCT Pub. No.: WO2010/095018
PCT Pub. Date: Aug. 26, 2010

(65) Prior Publication Data
US 2012/0106984 A1 May 3, 2012

Related U.S. Application Data

(60) Provisional application No. 61/152,992, filed on Feb. 17, 2009.

(51) Int. Cl.
| | |
|---|---|
| *H04B 10/06* | (2006.01) |
| *H04L 27/22* | (2006.01) |
| *H04B 10/60* | (2013.01) |
| *H04B 10/61* | (2013.01) |
| *H04J 14/06* | (2006.01) |
| *G02B 6/12* | (2006.01) |
| *G02B 6/28* | (2006.01) |

(52) U.S. Cl.
CPC .......... *H04L 27/223* (2013.01); *G02B 6/12004* (2013.01); *G02B 6/2813* (2013.01); *G02B 2006/12116* (2013.01); *H04B 10/60* (2013.01); *H04B 10/611* (2013.01); *H04J 14/06* (2013.01)

(58) Field of Classification Search
None
See application file for complete search history.

(56) References Cited

U.S. PATENT DOCUMENTS

| | | | | |
|---|---|---|---|---|
| 3,988,705 | A | * | 10/1976 | Drapac .......................... 333/109 |
| 4,852,958 | A | * | 8/1989 | Okuyama et al. ................ 385/17 |
| 4,858,958 | A | * | 8/1989 | Harbeke .......................... 285/31 |

(Continued)

FOREIGN PATENT DOCUMENTS

| | | |
|---|---|---|
| EP | 0282268 A1 | 9/1988 |
| JP | 63-234228 A | 9/1988 |

(Continued)

OTHER PUBLICATIONS

Soldano et al., Optical Multi-Mode Interference Devices Based on Self-Imaging: Principles and Applications, Apr. 1995, IEEE, Journal of Lightwave Technology, vol. 13, pp. 615-625.*

(Continued)

*Primary Examiner* — Ken Vanderpuye
*Assistant Examiner* — Jai Lee
(74) *Attorney, Agent, or Firm* — Fenwick & West LLP

(57) ABSTRACT

Optical devices are disclosed consisting of optical chips (planar lightwave circuits) which have optically symmetric or matching designs and properties and optical components which create asymmetry in the optical devices. The devices find application in detection in coherent and non-coherent optical communications systems.

10 Claims, 18 Drawing Sheets

(56) References Cited

U.S. PATENT DOCUMENTS

| | | | |
|---|---|---|---|
| 7,058,259 B2* | 6/2006 | Stuart | 385/28 |
| 7,650,084 B2* | 1/2010 | Chen et al. | 398/206 |
| 7,715,720 B2* | 5/2010 | Shpantzer et al. | 398/82 |
| 2003/0118286 A1* | 6/2003 | Kamei et al. | 385/37 |
| 2005/0013528 A1* | 1/2005 | Doerr | 385/14 |
| 2005/0286911 A1* | 12/2005 | Doerr et al. | 398/214 |
| 2007/0274733 A1 | 11/2007 | Shpantzer et al. | |
| 2010/0166427 A1* | 7/2010 | Jeong | 398/82 |

FOREIGN PATENT DOCUMENTS

| | | | |
|---|---|---|---|
| JP | 2001-147452 A | 5/2001 | |
| JP | 2003-60575 A | 2/2003 | |
| JP | 2003-506736 A | 2/2003 | |
| JP | 2004-51128 A | 4/2004 | |
| JP | 2004-184990 A | 7/2004 | |
| JP | 2008-102451 A | 5/2008 | |
| JP | 2008-177759 A | 7/2008 | |
| JP | 2008-278249 A | 11/2008 | |
| WO | 03036834 A1 | 5/2003 | |

OTHER PUBLICATIONS

Leuthold et al., Multimode Interference Couplers with Tunable Power Splitting Ratios, 2001, IEEE, Journal of Lightwave Technology, Volu. 19, pp. 700-707.*

Zimmermann et al., C-Band Optical 90 degrees-Hybrids Based on Silicon-on-Insulator 4x4 Waveguide Couplers, 2009, IEEE, IEEE Photonics Technology Letters, Volu. 21, pp. 143-145.*

Soldano et al., Optical Multi-Mode Interference Devices Based on Self-Imaging: Principles and Applications, 1995, IEEE, pp. 615-627.*

International Search Report and Written Opinion for Application No. PCT/IB2010/000303 dated May 12, 2011.

PCT Patent Application No. PCT/IB2010/000303 International Preliminary Report on Patentability dated Sep. 1, 2011.

European Patent Office, Extended European Search Report, European Patent Application No. 13165776.9, Sep. 24, 2013, 10 Pages.

Klamkin et al., "Monolithically Integrated Balanced Uni-Traveling-Carrier Photodiode with Tunable MMI Coupler for Microwave Photonic Circuits," IEEE 2006 Conference on Optoelectronics and Microelectronics, Dec. 1, 2006, pp. 184-187, XP031201941.

Japanese Patent Office, Notice of Reasons for Rejection, Japanese Patent Application No. 2011-550663, 5 pages, Jul. 18, 2013.

Oguma, M., et al., "PLC Type Delay Interfermometer for DQPSK Signal Demodulation," Proceedings of the Institute of Electronics, Information and Communication Engineers, Mar. 5, 2008, vol. 2008 Electronics 1, p. 198.

State Intellectual Property Office of the People's Republic of China, First Office Action, Chinese Patent Application No. 201080016962.6, Sep. 22, 2013, 29 pages (with English translation).

Second Office Action for Chinese Patent Application No. 201080016962.6, Apr. 23, 2014, 8 pages.

* cited by examiner

OPTICAL CHIPS AND DEVICES FOR OPTICAL COMMUNICATIONS

RELATED APPLICATION DATA

This application claims the benefit of U.S. Provisional Patent Application No. 61/152,992 filed Feb. 17, 2009 which is incorporated herein by reference in its entirety.

TECHNICAL FIELD

The present invention relates generally to optical receivers, and in particular to such receivers for receiving an optical signal encoded with phase-shift-keying modulation, such as quadrature phase-shift-keying (QPSK).

BACKGROUND

Optical modulation, such as optical differential quadrature phase-shift-keying (DQPSK) and polarization division multiplex optical quadrature phase-shift-keying (PDM-QPSK), enables spectrally-efficient communication in the optical domain. Such modulated signals may be transmitted by a transmitter, propagated through an optical waveguide, and demodulated (or decoded) using a receiver.

FIG. 1 illustrates the functionality of a receiver 100 for demodulating a DQPSK signal, as is conventionally known. An incoming optical carrier signal 102 encoded with DQPSK modulated data is approximately equally split at 104 into two data signals, one of which incurs a delay at 106 approximately equal to a symbol period of the modulated signal. The relative phase of the optical carrier in the two optical data signals is adjusted by use of phase control electrodes 110 and optionally the auxiliary control electrodes 108. These two data signals are recombined in the 90° optical hybrid mixer 112 (hybrid-90). The hybrid-90 112 functions to combine the two signal inputs into four signal outputs. Each output combines equal proportions of the input signal, but has different relative phases of 0°, 90°, 180°, and 270°, respectively, but not necessarily in this order. The two outputs with relative phase-difference of 0° and 180° carry the encoded in-phase data (the I-channel), and the two outputs with relative phase-difference of 90° and 270° carry the encoded quadrature-phase data (the Q-channel). The four optical output signals of the hybrid-90 112 are successively converted into electrical currents and then into amplified voltage signals by use of a combination of waveguide photodiodes 114 and transimpedance amplifiers 116 (TIAs). The optical signals for each of the I- and Q-channels are detected differentially. This can be done either with two balanced pairs of photodiodes 114 connected to two TIAs 116, or with four single-ended photodiodes 114 connected to two differential-input TIAs 116.

FIG. 2 illustrates the functionality of a receiver 200 for demodulating a PDM-QPSK signal, as is conventionally known. Here the incoming optical carrier signal 202 is encoded with two orthogonal polarization states of QPSK modulated data. The incoming optical carrier signal 202 is split at 204 into two separate optical components. One of the two polarization components may be rotated at 206 so as to have into a common single polarization state for comparison with a reference signal from a local oscillator 208 (LO). The detection of the two optical signals performed by the respective hybrid-90s 212, waveguide photodiodes 214, and TIAs 216 is similar to that performed in the DQPSK receiver 100, except that it is the absolute phase state that is modulated, rather than the differential phase between one bit slot and the next. To decode the absolute phase state, the signals are compared with the LO 208 reference signal at the same or similar optical frequency. The same LO 208 signal can be split into two outputs or elements for comparison with the two polarization components of QPSK data at respective hybrid-90s 212, the outputs of which are successively converted into electrical currents and then into amplified voltage signals by use of a combination of photodiodes 214 and TIAs 216. For illustration purposes, FIG. 2 shows all the functions of the PDM-QPSK demodulator receiver. Although, for convenience, each hybrid-90 and its accompanying waveguide photodiodes could be on a separate chip, with the polarization split, polarization rotation, and LO split performed off-chip, for example, in micro-optic components.

As optical communications become faster, the integration of optical components at the chip level has developed rapidly due, in part, to the demand for smaller optical components at reduced costs reduction. For example, a design of an optical DQPSK decoder has been disclosed in U.S. Pat. No. 7,259,901 to Parsons et al. Parsons et al. discloses the use of a 4×4 multi-mode interference filter (MMI) as an optical phase shifter (hybrid-90) together with on-chip optical delay and off-chip detection. This device is preferably realised in silicon photonics.

Similar implementations have been disclosed. For example, silica-on-silicon implementation of the optical hybrid-90 was published by C R Doerr (Lucent Bell Labs) IEEE JLT 24(1) p 171 January 2006 using a star coupler. A monolithic InP DQPSK receiver was published by C R Doerr (Lucent Bell Labs) in a paper "Monolithic InP DQPSK 53.5-Gb/s receiver" at the conference ECOC-07 (September 2007) using a 2×4 star-coupler, thermo-optic and current injection phase shifters, waveguide photodetectors and on-chip optical delay. M Oguma et at (NTT) presented a paper "Single MZI-based 1×4 DQPSK demodulator" at the OFC-2008 meeting (March 2008) using a hybrid-90 design with 2×2 MMI couplers, an on-chip optical delay with insertion of a half-waveplate to counteract impairments due to optical birefringence asymmetries.

However, these conventional chip implementations all have associated disadvantages. They suffer from asymmetric birefringence (or double refraction) and phase control problems. Birefringence can be problematic, especially when the device needs to compare one signal or channel with another for an unknown state of polarization. A difference in phase or apparent path length can affect the device to the extent of rendering it ineffective.

The birefringence of the semiconductor waveguides also makes the optical delay function hard to realize and control on an integrated chip. In addition, the magnitude of the delay (e.g., a 1 symbol delay is typically 20-50 ps) requires a relatively large area of semiconductor material to implement.

For the PDM-QPSK coherent receiver, illustrated in FIG. 2, the requirement is to achieve the hybrid-90 function and balanced detection at a fixed polarization condition, over wavelength and temperature of operation. For both the DQPSK receiver and the PDM-QPSK coherent receiver this drives the need for symmetry of waveguide insertion losses.

Integration of optical components at the chip level demands that there is sufficient volume of production to justify the investment in the chips, and once set up, there is little room for providing customised solutions to customers. The challenge associated with designing a DQPSK decoder is to select and integrate the functional elements such that the performance is maintained over a range of operating wavelengths (for example C-band or L-band), over all states of polarization, over the required case-temperature range, and over the life of the decoder.

SUMMARY OF INVENTION

The present invention provides a semiconductor demodulator chip, for example a QPSK decoder chip, containing a 90° hybrid structure and photodiode detectors, typically fabricated in InP, containing waveguide paths which are balanced in insertion loss and birefringence. The balancing of insertion loss and birefringence is achieved by one or more or a combination of dummy waveguide cross-overs, or MMI cross-overs. The symmetrical design of the QPSK chip allows for the chip to operate over a range of wavelengths and temperatures. Off-chip delay also may be used in conjunction with the QPSK chip, thereby allowing for customization of the delay period to be used on the chip.

According to one aspect of the invention, a QPSK chip for demodulating an optical signal includes: an input for receiving a QPSK modulated signal; an optical hybrid mixer for receiving the QPSK modulated signal and mixing the QPSK modulated signal into a plurality of output signals; a plurality of photodiodes, each detecting a corresponding one of the plurality of output signals; a plurality of output waveguides, each coupling one of the plurality of photodiodes to a respective output of the optical hybrid mixer corresponding to one of the plurality of output signals; and at least a first dummy waveguide cross-over included along one of the plurality of output waveguides to balance at least one of insertion loss and birefringence among the plurality of output waveguides.

According to one embodiment, the first dummy waveguide cross-over balances an imbalance due to a first cross-over between at least two of the plurality of output waveguides.

According to another embodiment, the first dummy waveguide cross-over intersects the one output waveguide at the same angle of intersection as the first cross-over between at least two of the plurality of output waveguides.

According to another embodiment, the QPSK chip includes a second dummy waveguide cross-over included along the one output waveguide to balance at least one of insertion loss and birefringence among the plurality of output waveguides.

According to another embodiment, the second dummy waveguide cross-over balances an imbalance due to a second cross-over between at least two of the plurality of output waveguides.

According to another embodiment, the QPSK chip includes a third dummy waveguide cross-over and fourth dummy waveguide cross-over included along respective other output waveguides to balance at least one of insertion loss and birefringence among the plurality of output waveguides.

According to another embodiment, the input is coupled to an off-chip delay unit that splits and delays the QPSK modulated signal.

According to another aspect of the invention, a QPSK chip for demodulating an optical signal includes: an input for receiving a QPSK modulated signal; an optical hybrid mixer for receiving the QPSK modulated signal and mixing the QPSK modulated signal into a plurality of output signals; a plurality of photodiodes, each detecting a corresponding one of the plurality of output signals; a plurality of output waveguides, each coupling one of the plurality of photodiodes to a respective output of the optical hybrid mixer corresponding to one of the plurality of output signals; and at least a first double-length MMI coupler included along at least two of the plurality of output waveguides to cross-over the at least two of the plurality of output waveguides and balance at least one of insertion loss and birefringence among the plurality of output waveguides.

According to one embodiment, the QPSK chip includes a second double-length MMI coupler included along at least two of the plurality of output waveguides to cross-over the at least two of the plurality of output waveguides and balance at least one of insertion loss and birefringence among the plurality of output waveguides.

According to another embodiment, the QPSK chip further includes at least a first dummy double-length MMI coupler included along at least one of the plurality of output waveguides to balance at least one of insertion loss and birefringence among the plurality of output waveguides.

According to another embodiment, the QPSK chip includes a second dummy double-length MMI coupler included along another one of the plurality of output waveguides to balance at least one of insertion loss and birefringence among the plurality of output waveguides.

According to another embodiment, the input is coupled to an off-chip delay unit that splits and delays the QPSK modulated signal.

According to another aspect of the invention, a QPSK chip for demodulating an optical signal, includes: an input for receiving a QPSK modulated signal; an optical hybrid mixer for receiving the QPSK modulated signal and mixing the QPSK modulated signal into a plurality of output signals, the optical hybrid mixer including an asymmetrical network of MMI couplers that includes: a 1×2 MMI coupler; and a first 2×2 MMI coupler; a plurality of photodiodes, each detecting a corresponding one of the plurality of output signals; and a plurality of output waveguides, each coupling one of the plurality of photodiodes to a respective output of the optical hybrid mixer corresponding to one of the plurality of output signals.

According to one embodiment, the 1×2 MMI coupler and the 2×2 MMI coupler impart a 90° phase difference to the QPSK modulated signal.

According to another embodiment, the 1×2 MMI coupler includes a plurality of outputs; the first 2×2 MMI coupler includes a plurality of outputs; and a plurality of intermediate waveguides couple the respective outputs of the 1×2 MMI coupler and the first 2×2 MMI coupler to one of a second 2×2 MMI coupler and a third 2×2 MMI coupler.

According to another embodiment, the QPSK chip includes a cross-over between at least two of the plurality of intermediate waveguides.

According to another embodiment, the first 2×2 MMI coupler is designed such that it has a deliberate imbalance in its output power.

According to another embodiment, the optical hybrid mixer includes at least one dummy waveguide cross-over included along one of the plurality of intermediate waveguides to balance at least one of insertion loss and birefringence among the plurality of intermediate waveguides, and the first dummy waveguide cross-over balances an imbalance due to the cross-over between at least two of the plurality of intermediate waveguides.

According to another embodiment, the optical hybrid mixer includes a double-length MMI coupler included along at least two of the plurality of intermediate waveguides to cross-over the at least two of the plurality of intermediate waveguides and balance at least one of insertion loss and birefringence among the plurality of intermediate waveguides.

According to another embodiment, the input is coupled to an off-chip delay unit that splits and delays the QPSK modulated signal.

The foregoing and other features of the invention are hereinafter described in greater detail with reference to the accompanying drawings.

DESCRIPTION

Figure 1:
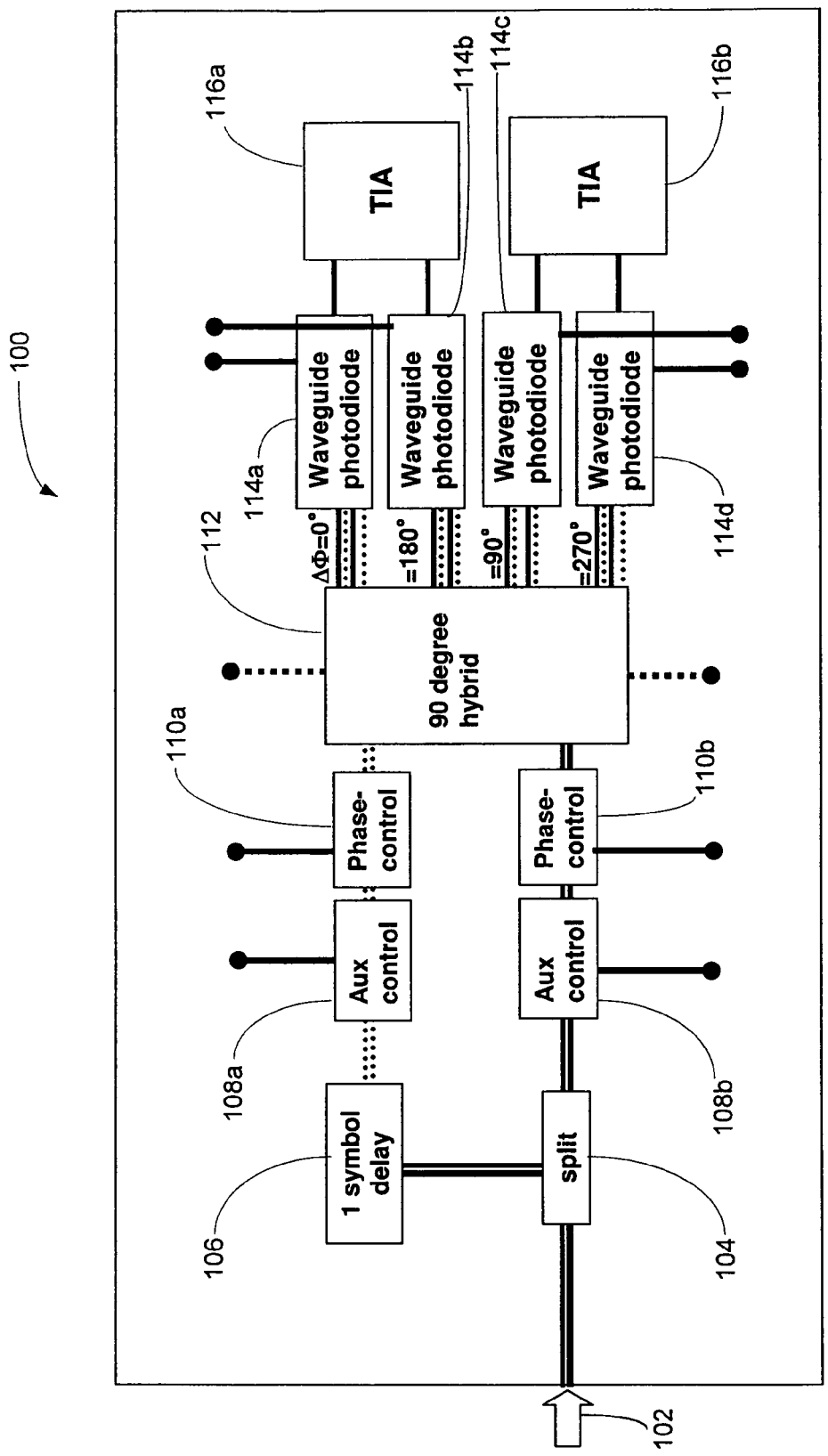
FIG. 1 is a schematic diagram of the functionality of a receiver for demodulating a DQPSK signal.
Figure 2:
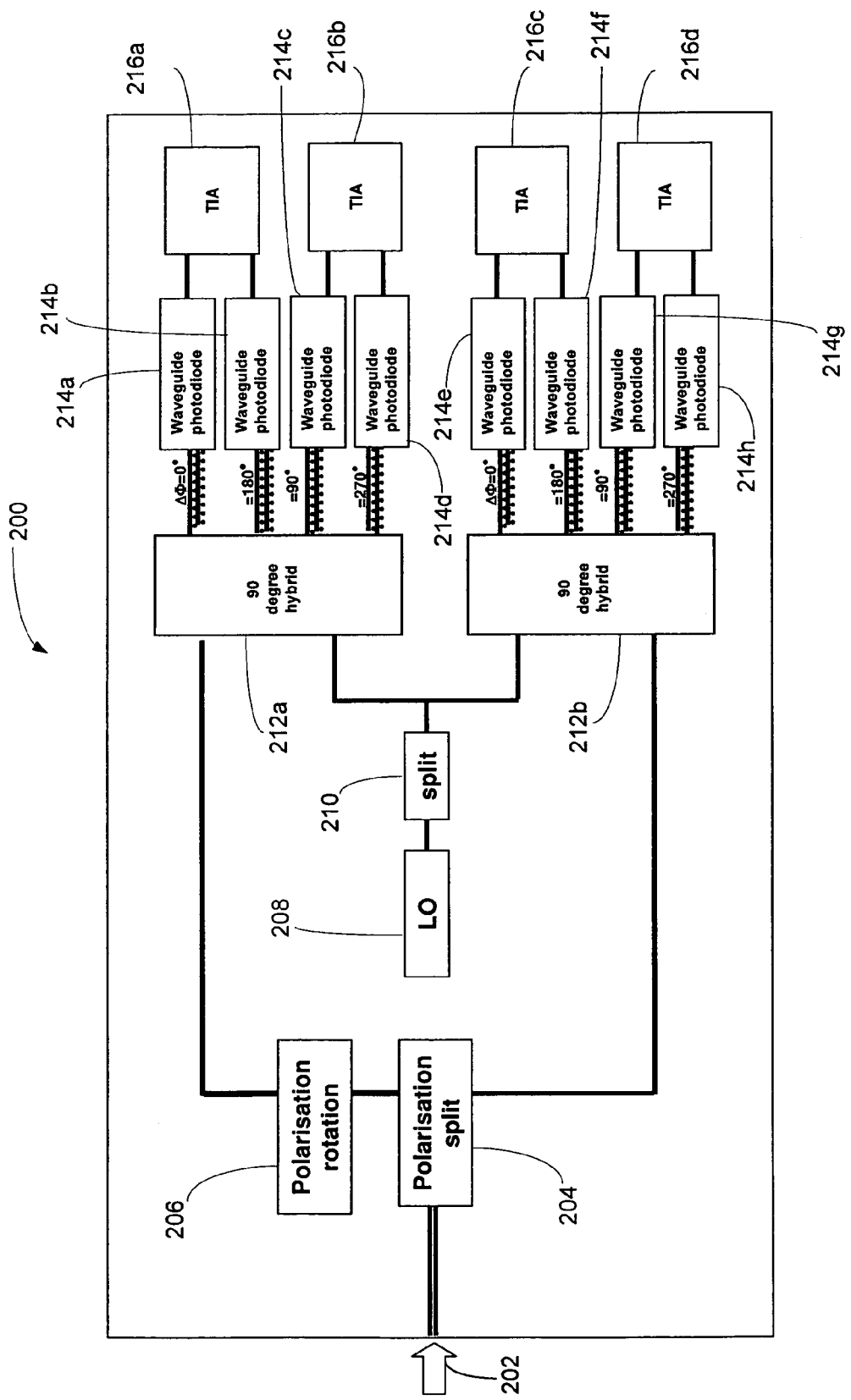
FIG. 2 is a schematic diagram of the functionality of a receiver for demodulating a PDM-QPSK signal.

The principles of the present invention have particular application to chips for demodulating DQPSK and PDM-QPSK signals and thus will be described below chiefly in this context. It will of course be appreciated, and also understood, that the principles of the invention may be useful in other applications including, in particular, chips for demodulating other optical modulations and optical sensing applications and more generally applications where optical signals are demodulated by optical chips.

In the description that follows, like components have been given the same reference numerals, regardless of whether they are shown in different embodiments. To illustrate an embodiment(s) of the present invention in a clear and concise manner, the drawings may not necessarily be to scale and certain features may be shown in somewhat schematic form. Features that are described and/or illustrated with respect to one embodiment may be used in the same way or in a similar way in one or more other embodiments and/or in combination with or instead of the features of the other embodiments.

QPSK Chip

Figure 3:
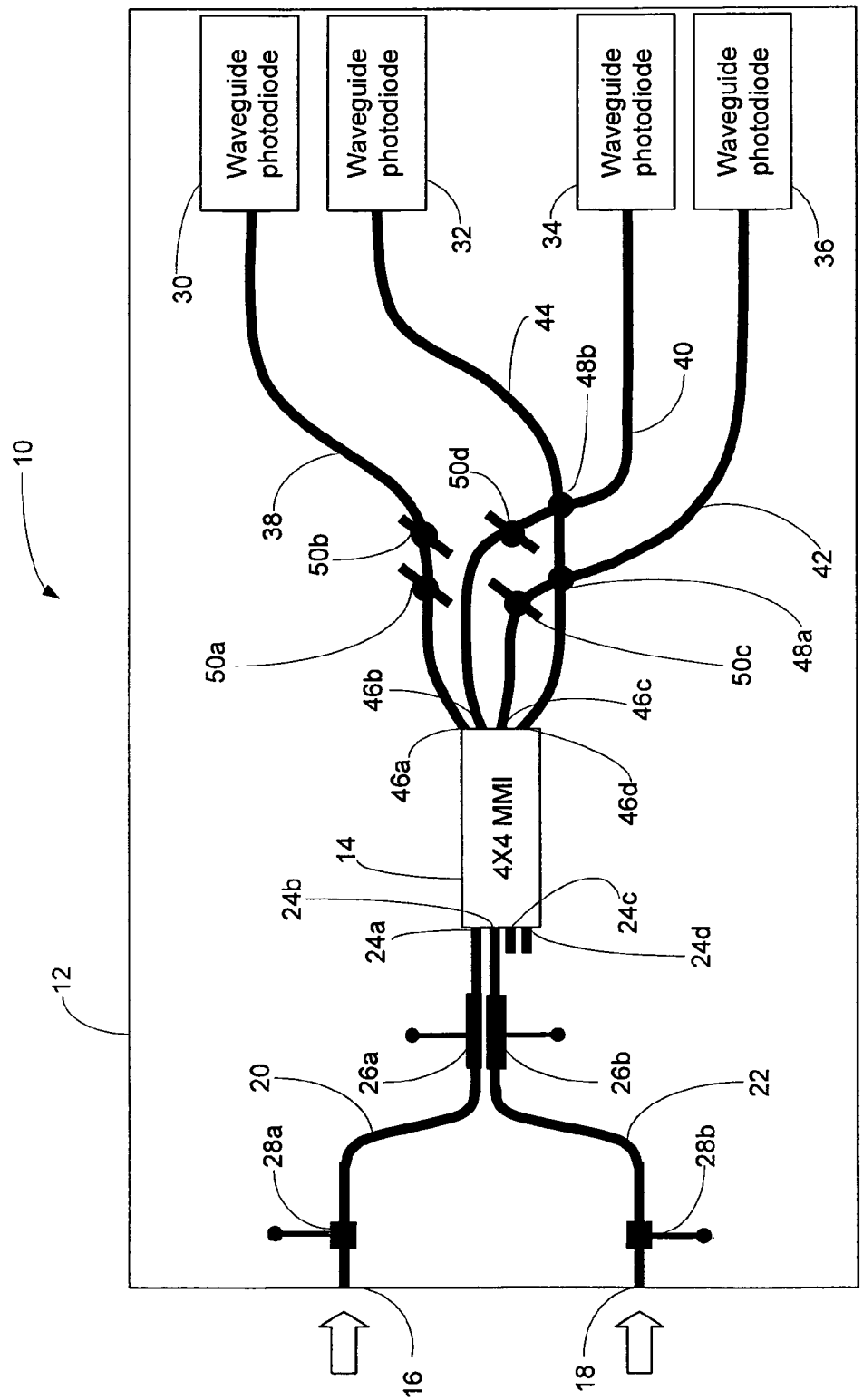
FIG. 3 is a schematic diagram of an exemplary QPSK chip including symmetric inputs into a 4×4 MMI coupler, waveguide crossovers to re-order the outputs, dummy-waveguide cross-overs, and single-ended waveguide PIN photodiodes in accordance with the invention.
Figure 4:
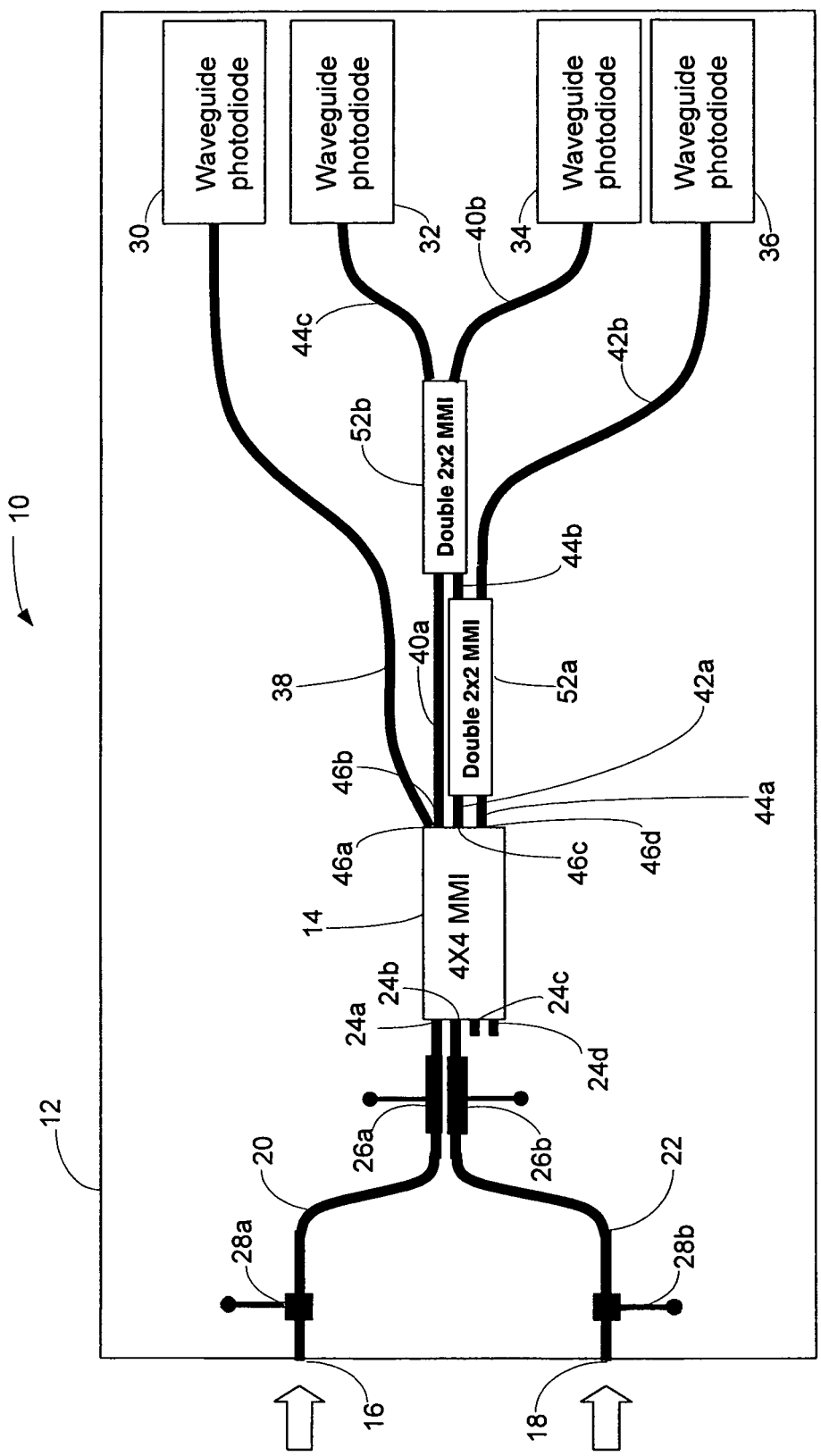
FIG. 4 is a schematic diagram of an exemplary QPSK chip including symmetric inputs into a 4×4 MMI coupler, double-length 2×2 MMI couplers to re-order the outputs, and single-ended waveguide PIN photodiodes in accordance with the invention.

Referring now in detail to the drawings and initially to FIGS. 3 and 4, a schematic diagram of an exemplary QPSK chip is shown generally at 10.

The chip substrate 12 may be constructed from InP. However, it is to be understood that the chip substrate 12 may be also be constructed from any semiconductor materials that are suitable for providing integration of optical waveguides, optical couplers, optical phase control and high speed detection within a compact device (e.g., InGaAs, InGaAsP).

In the present embodiment, the hybrid-90 is implemented on the chip using a 4×4 MMI coupler 14. The 4×4 MMI coupler 14 and other MMI couplers disclosed herein are of a standard design and are implemented within existing process design rules known in the art. The use of MMI couplers in hybrid-90 implementations is discussed, for example, in "Optical Multi-Mode Interference Devices Based on Self-Imaging: Principles and Applications" by Lucas B. Soldano and Erik C. M. Pennings, IEEE JOURNAL OF LIGHTWAVE TECHNOLOGY, VOL. 13, NO. 4, APRIL 1995, p 615; "Options, Feasibility, and Availability of 2×4 90° Hybrids for Coherent Optical Systems", Matthias Seimetz and Carl-Michael Weinert, IEEE JOURNAL OF LIGHTWAVE TECHNOLOGY, VOL. 24, NO. 3, MARCH 2006, p 1317; and "Ultracompact, All-Passive Optical 90°-Hybrid on InP Using Self-Imaging" E. C. M. Pennings, R. J. Deri, R. Bhat, T. R. Hayes and N. C. Andreadakis, IEEE PHOTONICS TECHNOLOGY LETTERS, VOL. 5, NO. 6, JUNE 1993, p 701.

The chip 10 includes input ports 16 and 18. More particularly, a QPSK encoded signal may be input to, and may be received by, at least one of input ports 16 and 18. In a differentially QPSK receiver application, the encoded data signal input to respective inputs ports 16 and 18 could represent a direct signal and a time-delayed signal. In a coherent receiver application, the encoded signal input to either of respective input ports 16 and 18 could represent a QPSK coded data-signal, and at the other input port, a reference signal from a LO (not illustrated) at a carrier frequency which is very close to that of the signal channel could be input.

The chip 10 includes a plurality of waveguides 20 and 22 (i.e., input waveguides or optical channels) that couple respective ones of a signal input ports 16 and 18 to the 4×4 MMI coupler 14. A waveguide is a structure for guiding waves, in this case optical waves (signals). The optical signal may be passed through the respective waveguides 20 and 22 to the 4×4 MMI coupler 14. The waveguides 20 and 22 may be hard-walled on the chip 10 in order to support tight bends with low optical loss. For example, a well-known ridge-guided design of waveguide can be fabricated by well-known methods of epitaxial growth and semiconductor etching to provide a set of semiconductor layers of controlled material composition and thickness so as to form a waveguide-core of one or more layers of higher refractive index with one or more cladding layers above and below of lower refractive index. The upper cladding, waveguide core and part of the lower cladding are etched away to define the width of the waveguide.

In one embodiment, the waveguides 20 and 22 are optically equivalent in birefringence and path length. Such optical equivalent waveguides are termed here "symmetrical." The term symmetrical shall be understood to mean equivalent with respect to optical birefringence and optical path length, unless otherwise stated. Another way of describing the design for two equivalent waveguides would be a "matched pair" design. In applications where the chip 10 is used for any state-of-polarization, the waveguides 20 and 22 are designed to be identically or near-identically matched in length and width from the signal input up to the input of the 4×4 MMI coupler 14. This is to ensure that any birefringence in the waveguides is matched.

The two waveguides 20 and 22 are coupled to separate specific inputs 24 of the 4×4 MMI coupler 14 for 90° phase mixer functionality. That is, the 4×4 MMI coupler 14 includes four inputs 24a-d, and two of the inputs 24 are respectively coupled to the waveguides 20 and 22 for receiving the input signal while the other two inputs 24 are unused. The waveguides 20 and 22 may be coupled to the inputs 24 in any of these specific possible arrangements (24a and 24b, 24a and 24c, 24c and 24d, and 24b and 24d).

Phase and auxiliary controls may also be included along the waveguides 20 and 22. Specifically, one or more phase electrodes 26 may be included along the waveguides 20 and 22 to enable adjustment of the relative optical phases of the signals. Resistive heaters on the top of the ridge-waveguide are used to provide a localised heating of the waveguide core which results in a modal refractive index change to adjust the optical phase. This refractive index change is substantially independent of polarization, and so this phase change does not introduce any substantial asymmetric birefringence when phase electrodes 26a and 26b are adjusted separately. In contrast, a forward-bias current injected into the semiconductor core layers induces changes to the phase of the optical propagation which may be polarization dependent. This depends upon the extent to which the confinement of the optical mode to the waveguide core varies with the polarization of the optical mode.

Also, one or more auxiliary electrodes 28 may be included along the waveguides 20 and 22 to control alignment and additional adjustment of the relative optical phases of the signals. These auxiliary electrodes are connected to regions of the waveguide which are doped so as to form an electrical PIN diode structure, as is well known. In this case, one example would be that the upper and lower cladding layer or layers are doped, or partly doped, with acceptors and donors to provide P or N-type conductivity, respectively, and the waveguide core layer is partly or wholly undoped, to form the intrinsic layer. Specifically, if the auxiliary electrode 28 is biased, it can be deployed as forward-biased so as to inject carriers into the waveguide optical core, and so modify its optical properties; or reverse-biased so as to provide an electric field dependent modification of the optical properties of the waveguide optical core. In an embodiment including the forward-biasing operation, the auxiliary electrode 28 introduces variable birefringence, which can be used to cancel out any other sources of birefringence which otherwise would lead to an undesirable polarization-dependent frequency shift (PDFS) in the performance of the DQPSK demodulator, as taught by C R Doerr, in a paper presented at ECOC-07. In an embodiment including the reverse-biasing operation, the auxiliary electrode 28 can be used either at relatively low reverse bias to adjust the phase and partially attenuate the optical signal in order to correct for any imbalance in coupling between the two inputs, (this correction also being polarization dependent); or, with an increased level of reverse-bias, to strongly attenuate the input light, and detect the resultant photocurrent so as to monitor the coupled optical power during set-up of the device. In this case, the waveguide PIN structure would be designed to have a semiconductor core layer or layers, which have a band-gap energy such that, under reverse-bias, the band-gap absorption edge has some degree of overlap with the photon energy of the optical signal.

Although not illustrated, there could additionally be an optional spot-size converter at each of the input ports 16 and 18 of the chip 10 for ease of optical alignment in fabrication. There could also be optional optical power monitors (not illustrated) within each of the waveguides 20 and 22 close to the input ports 16 and 18, for input alignment and for diagnostic purposes in operation.

The chip 10 includes high-speed waveguide photodiodes 30, 32, 34, and 36 (detectors) having sufficient bandwidth to detect the QPSK modulated signal at a given bit-rate. In one embodiment, the waveguide photodiodes 30, 32, 34, and 36 include a combination of P-doped, intrinsic (undoped), and N-doped semiconductor layers, forming a PIN diode structure within a defined length of waveguide, in which the intrinsic layers include an absorbing layer of InGaAs (with a composition typically of In(0.53)Ga(0.47)As). An optical signal at the wavelength of operation of the receiver (for example 1550 nm), is partly or wholly absorbed within this InGaAs layer along the length of the waveguide PIN diode, and generates electron and hole charge carriers in the semiconductor, which can be collected as a photocurrent at anode and cathode electrodes connected to the P-doped and N-doped layers, respectively, under application of a reverse-bias. The design of waveguide photodiodes is well known. One example of a possible implementation is shown in a paper by M G Boudreau et al "An Integrated Waveguide Detector for Power Control in an InP Mach-Zehnder Modulator Based 10 Gb/s Transmitter" in the Proceedings of the Indium Phosphide and Related Materials Conference (IPRM) held in 2006. The design width and length of the waveguide detectors is chosen to provide maximal responsivity within the constraint placed on the detector junction area by its capacitance. The thickness of the intrinsic-doped layer, including the InGaAs absorbing layer, is chosen to enable quick transport of the photo-generated carriers to the P and N doped regions, to meet the required speed of operation of the detector for the application. These waveguide photodiodes 30, 32, 34, and 36 are designed to have substantially equal responsivities (the conversion of optical power into electrical current) and electrical bandwidth.

On-chip decoupling capacitors (not illustrated) may also optionally be included to mitigate the effects of electrical inductance from the external wirebonds which connect to and provide DC reverse bias to the cathodes of waveguide photodiodes 30, 32, 34, and 36. The decoupling capacitors can be constructed as either metal-insulator-metal (MIM) or metal-insulator-semiconductor (MIS) capacitors, as is well known to those skilled in the art.

The waveguide photodiodes 30, 32, 34, and 36 may be constructed either as single-ended detectors respectively coupled to each of four outputs 46*a-d* of the 4×4 MMI coupler 14 with differential detection off-chip at the TIA (not illustrated), or as two pairs of balanced photodiodes for on-chip differential detection of the I-channel and Q-channel output pairs of the 4×4 MMI coupler 14. The single ended embodiment is illustrated, for example, in FIGS. 3 and 4. The balanced embodiment is discussed in more detail below with reference to FIG. 5, for example.

Waveguides 38, 40, 42, and 44 (i.e., output waveguides or optical channels) couple output ports 46 of the 4×4 MMI coupler 14 to the respective waveguide photodiodes 30, 32, 34, and 36. The optical signal may be passed through the respective waveguides 38, 44, 40, and 42 to the respective waveguide photodiodes 30, 32, 34, and 36. Specifically, the waveguides 38, 40, 42, and 44 are arranged into two pairs. Waveguide pair 38 and 44 are respectively coupled at one end to output ports 46*a* and 46*d* (I-channel outputs having relative phase offsets 0° and 180°), and are respectively coupled at another end to photodiodes 30 and 32. Waveguide pair 40 and 42 are respectively coupled at one end to output ports 46*b* and 46*c* (Q-channel outputs having relative phase offsets 90° and 270°), and are respectively coupled at another end to photodiodes 34 and 36. The signals output from the 4×4 MMI coupler 14 may contain equal mixes of the two input signals 16 and 18, but with above-mentioned different relative phase offsets (i.e., 0°, 90°, 180°, and 270°).

The waveguides 38, 40, 42, and 44 between the output of the 4×4 MMI coupler 14 and the photodiodes 30, 32, 34, and 36 are designed to be identical or near identical lengths. This is to ensure that, in operation, data skew between the I- and Q-channels is within an allowable upper limit (e.g., less than 5% of the data bit-period). When viewed in combination with the length of the symmetrical waveguides 20 and 22, the total waveguide path lengths from the optical input ports 16 and 18 to the four photodiodes 30, 32, 34, and 36 are designed to be substantially equal.

The waveguides 38, 40, 42, and 44 coupling the output of the 4×4 MMI coupler 14 to the respective photodiodes 30, 32, 34, and 36 are reordered as a precursor to balanced detection for the appropriate I- and Q-channels at the photodiodes. As a consequence, the waveguide 38 or 44 crosses over waveguides 40 and 42. The waveguides 38, 40, 42, and 44 may be reordered, for example, by using RF co-planar waveguide cross-overs (not illustrated). However, as described in detail below, waveguides 38, 40, 42, and 44 may be reordered by the use of one or more or a combination of dummy waveguide cross-overs or MMI cross-overs.

With particular reference to FIG. 3, the waveguides 38, 40, 42, and 44 coupled to the output ports 46 of the 4×4 MMI coupler 14 may be reordered by using optical waveguide cross-overs 48. The waveguide cross-over 48 is an intersection of two waveguides. As illustrated in FIG. 3, waveguide cross-over 48*a* is present at the intersection of waveguide 44 and waveguide 42. Similarly, waveguide cross-over 48*b* is present at the intersection of waveguide 44 and waveguide 40. It is preferred that the cross-over 48 possesses a high angle of intersection to prevent cross-talk of the optical signal from one waveguide to the other. In one embodiment, the angle of intersection is about 90°. In another embodiment, the angle of intersection is greater than 60°. Also, while there may be scattering loss from the waveguide cross-over 48, this is minimized by appropriate choice of waveguide width. For example, in the case of a ridge-guided waveguide with an optical core thickness in the range typically about 0.25 to 0.50 microns, the waveguide width may be in the range of about 1.0 to 2.5 microns.

The optical signals which reach the photodiodes 30, 32, 34, and 36 are subject to optical losses in the waveguides 38, 40, 42, 44 and/or birefringence, and it is important to match (or balance) the optical losses for each of the waveguide outputs. Optical loss from waveguide cross-overs 48 can be a contribution to the optical loss in the waveguides. The losses may be balanced between waveguides 38 and 44 by including "dummy" cross-overs 50 in waveguide 38 to match the waveguide cross-overs 48 in waveguide 44. The dummy cross-over 50 may be fabricated with a "dummy" waveguide that intersects with the actual waveguide at the same or similar angle of intersection as cross-overs 48 to ensure the same loss. The dummy waveguide terminates at both ends and may have the same or similar ridge-width as the actual waveguide. As illustrated, waveguide 38 includes dummy waveguides 50*a* and 50*b*.

Similarly, dummy cross-overs 50 may be added to each of waveguides 40 and 42 to balance the average signal power and/or birefringence in the Q-channel with that in the I-channel. As illustrated, waveguide 40 includes dummy cross-over 50*d*, and waveguide 42 includes dummy cross-over 50*c*. In some cases it is not necessary that the average power in the I- and Q-channels match, so the dummy cross-overs 50 in waveguides in 40 and 42 are optional. By incorporating the dummy cross-over(s) 50, functional optical symmetry may be achieved among the respective waveguides 38, 40, 42, and 44.

With particular reference to FIG. 4, the waveguides 38, 40, 42, and 44 coupled to the output ports 46 of the 4×4 MMI coupler 14 may be reordered by using double-length 2×2 MMI 3 dB couplers 52, which function as optical cross-overs, as taught, for example, by L B Soldano (cited above). If a standard 2×2 (paired-interference) MMI 3 dB coupler is doubled in length, so as to have a length which is equal to the beat-length between the two lowest order modes within the MMI waveguide, then it acts as a cross-coupler, i.e. to transmit a signal to an output port that is a cross-port of the input port to which the signal was input. In the following, this 2×2 MMI cross-coupler will also be referred to as a double-length 2×2 MMI coupler and a double-length 2×2 MMI cross-over.

As illustrated, waveguide 38 is directly coupled to photodiode 30. As utilized in the embodiment of FIG. 4, two double-length 2×2 MMI couplers 52 perform the function of crossing waveguide 44 over waveguides 40 and 42. Specifically, a first end of waveguide 44a is coupled to output port 46d of the 4×4 MMI coupler 14, and a second end of waveguide 44a is coupled to an input port of a double-length 2×2 MMI coupler 52a. A first end of waveguide 44b is coupled to the cross-port output port of double-length 2×2 MMI coupler 52a, and a second end of waveguide 44b is coupled to an input port of a double-length 2×2 MMI coupler 52b. A first end of waveguide 44c is coupled to the cross-port output port of MMI coupler 52b, and a second end of waveguide 44c is coupled to photodiode 32.

Waveguide 42 is coupled to photodiode 36 via double-length 2×2 MMI coupler 52a. That is, a first end of waveguide 42a is coupled to output port 46c of the 4×4 MMI coupler 14, and a second end of waveguide 42a is coupled to a second input port of a double-length 2×2 MMI coupler 52a. A first end of waveguide 42b is coupled to the cross-port output port of double-length 2×2 MMI coupler 52a, and a second end of waveguide 42b is coupled to photodiode 36.

Waveguide 40 is coupled to photodiode 34 via double-length 2×2 MMI coupler 52b. That is, a first end of waveguide 40a is coupled to output port 46b of the 4×4 MMI coupler 14, and a second end of waveguide 40a is coupled to a second input port of double-length 2×2 MMI coupler 52b. A first end of waveguide 40b is coupled to the cross-port output port of double-length 2×2 MMI coupler 52b, and a second end of waveguide 40b is coupled to photodiode 34.

The advantage of using a double length 2×2 MMI coupler 52 as a cross-over within this optical hybrid chips is that the double-length 2×2 MMI coupler is laterally compact, keeping the waveguides close together. The dimensions of the double-length 2×2 MMI coupler are also chosen to give optimum transfer performance at the target wavelength and temperature of operation. Hence, the balancing of insertion loss and birefringence is achieved by the use of the double-length 2×2 MMI couplers 52, and the use of such double-length 2×2 MMI couplers 52 also achieves the functional optical symmetry among the respective waveguides 38, 40, 42, and 44.

As is well known for MMI couplers, there is a degree of tolerance in this optimal performance over a range of wavelengths, but there may be degradation in the insertion loss and level of cross-talk for larger changes in wavelength. For this reason, dummy double length 2×2 MMI cross-couplers (not illustrated) may be introduced on the other waveguides in a manner similar to the dummy cross-overs 50 of FIG. 3 to balance any excess losses and birefringence on all waveguides, thereby further assisting to maintain said functional optical symmetry. Specifically, two dummy double length 2×2 MMI cross-couplers may be introduced along waveguide 38. Also, a dummy double length 2×2 MMI cross-coupler may be introduced along waveguide 40, and a dummy double length 2×2 MMI cross-coupler may be introduced along waveguide 42. In each instance, the waveguide is input to an input port of the dummy double-length 2×2 MMI coupler, and output from a cross-port output port of the dummy double-length 2×2 MMI coupler.

Figure 5:
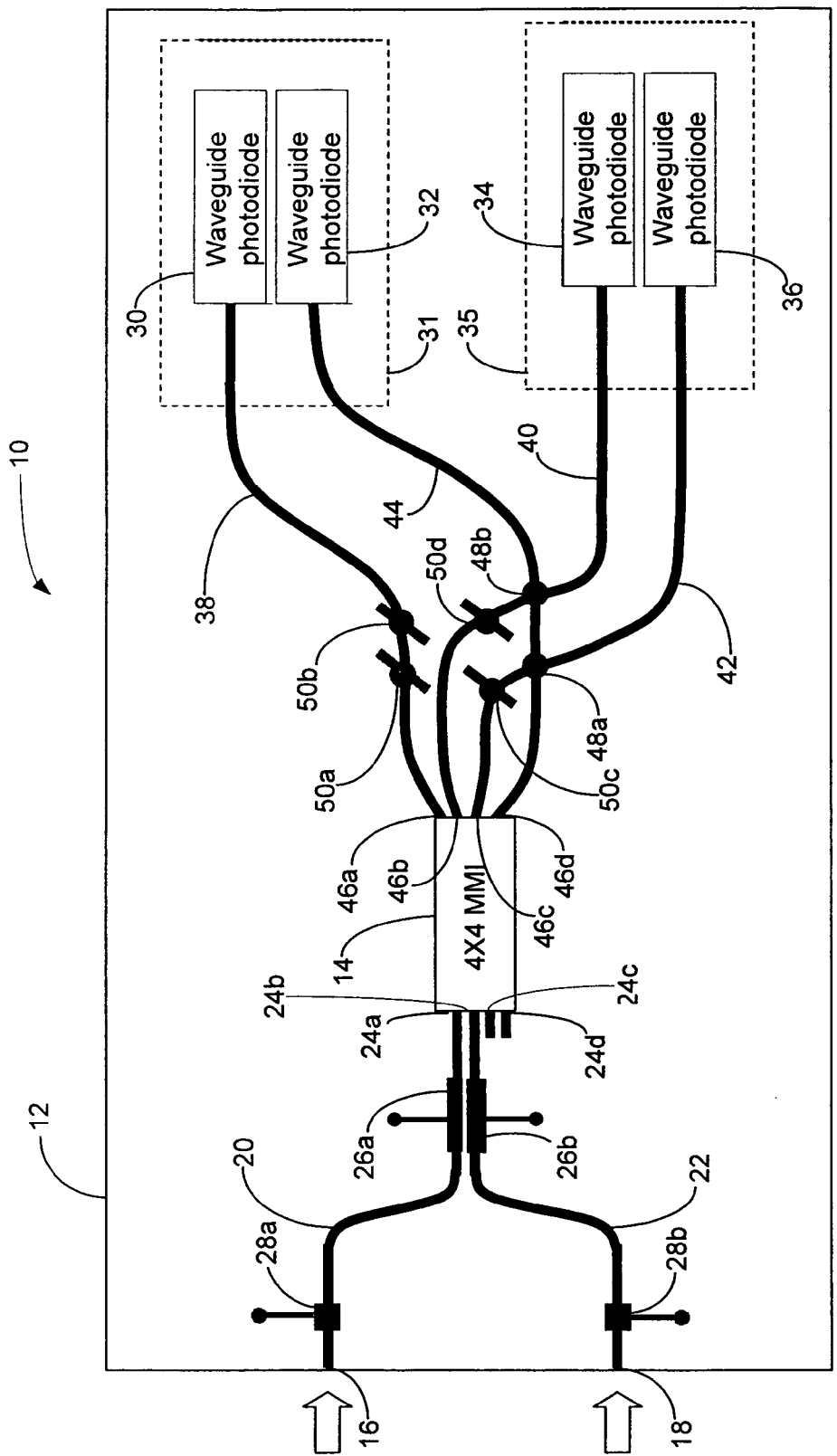
FIG. 5 is a schematic diagram of an exemplary QPSK chip including symmetric inputs into a 4×4 MMI coupler, waveguide crossovers to re-order the outputs, dummy-waveguide cross-overs, and balanced waveguide PIN photodiodes for differential detection on the chip in accordance with the invention.

Balanced (or differential) detection can be accomplished with two pairs of single-ended photodiodes on the chip (as shown in FIGS. 3 and 4) with the outputs of each pair connected to differential input TIAs. Alternatively, as illustrated in FIG. 5, balanced (or differential) detection can be accomplished directly on the chip 10 with two pairs of balanced photodiodes 31 and 35 on the chip 10. For example, in an embodiment where photodiodes 30 and 32 are operated as pair 31 and photodiodes 34 and 36 are operated as pair 35, the difference in photocurrent between 30 and 32 ($I_{30}$-$I_{32}$) is detected, and the difference in photocurrent between 34 and 36 ($I_{34}$-$I_{36}$) is detected.

As is well known, a balanced photodiode pair 31 and 35 is constructed by connecting the anode of one photodiode to the cathode of the other, and monitoring the net signal of the two photodiodes at this point, the two photodiodes having matched responsivity and electrical bandwidth. For the balanced photodiode arrangement, electrical isolation is provided between the P-doped semiconductor regions (which connect to the individual anodes) of the two photodiodes and between the N-doped semiconductor layers (which connect to the individual cathodes) of the two photodiodes. In the case of the single-ended PIN photodiode pair construction, isolation between the P-doped semiconductor regions of the two photodiodes is provided, with N-doped regions connected (common cathode); or isolation between the N-doped semiconductor regions of the two photodiodes is provided, with P-doped regions connected (common anode). Alternatively, both the P-doped and N-doped interconnecting layers can be electrically isolated between the photodiodes.

Figure 6:
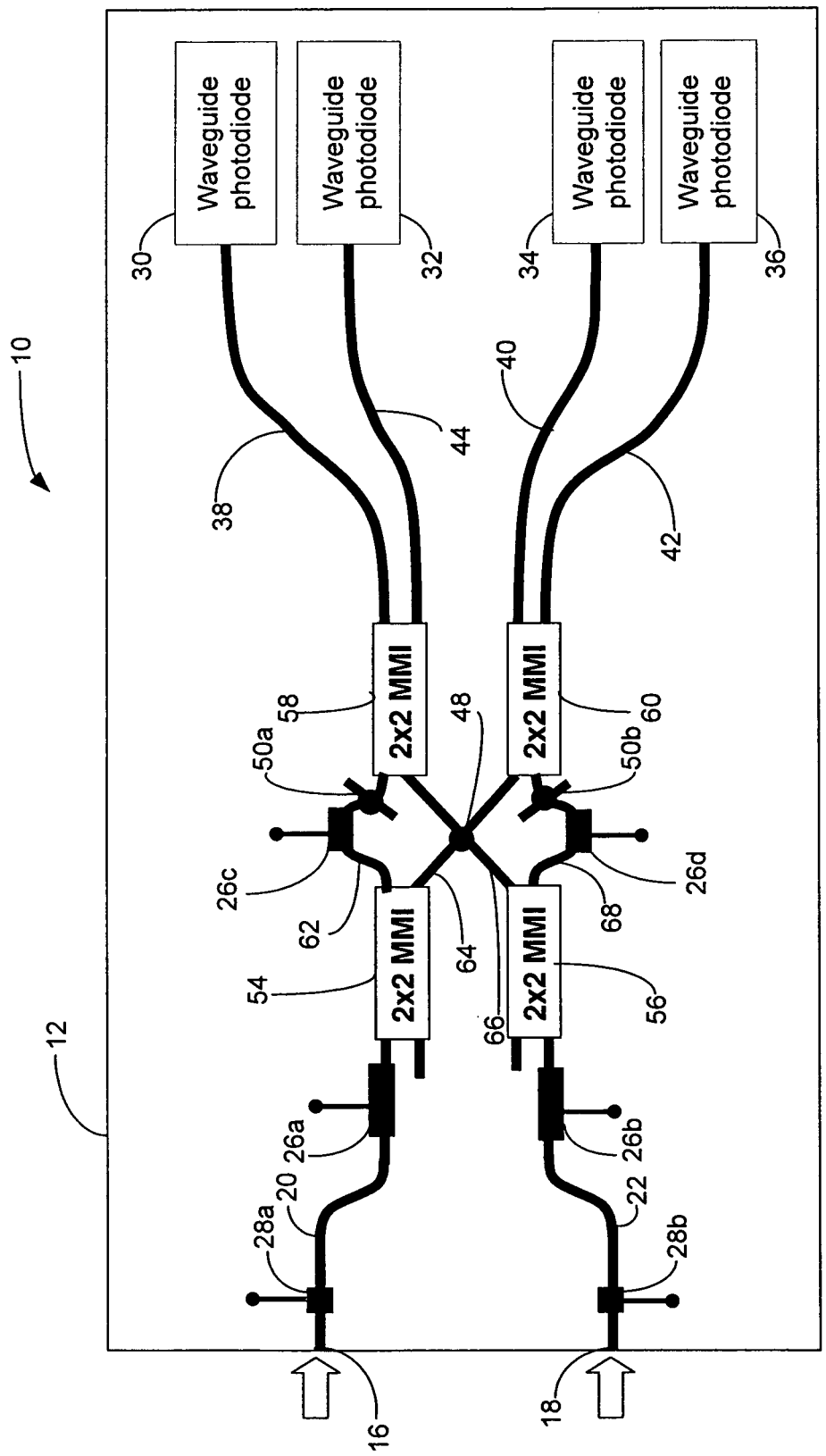
FIG. 6 is a schematic diagram of an exemplary QPSK chip including symmetric inputs into a network of 2×2 MMI couplers with phase-control and waveguide cross-over, dummy-waveguide cross-overs, and single-ended waveguide PIN photodiodes in accordance with the invention.
Figure 7:
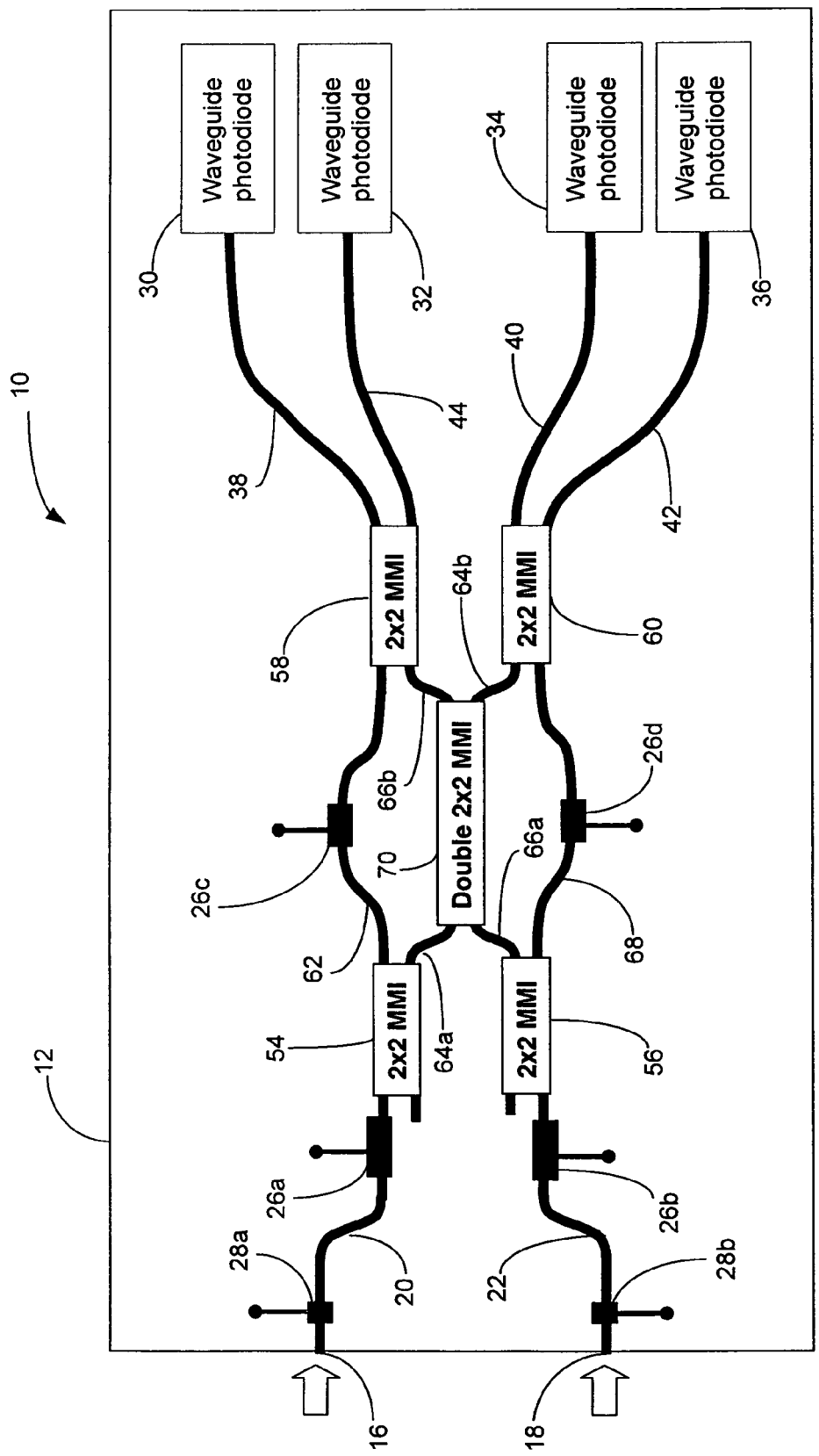
FIG. 7 is a schematic diagram of an exemplary DQPSK chip including symmetric inputs into a network of 2×2 MMI couplers with phase-control and a double-length 2×2 MMI coupler, and single-ended waveguide PIN photodiodes in accordance with the invention.
Figure 8:
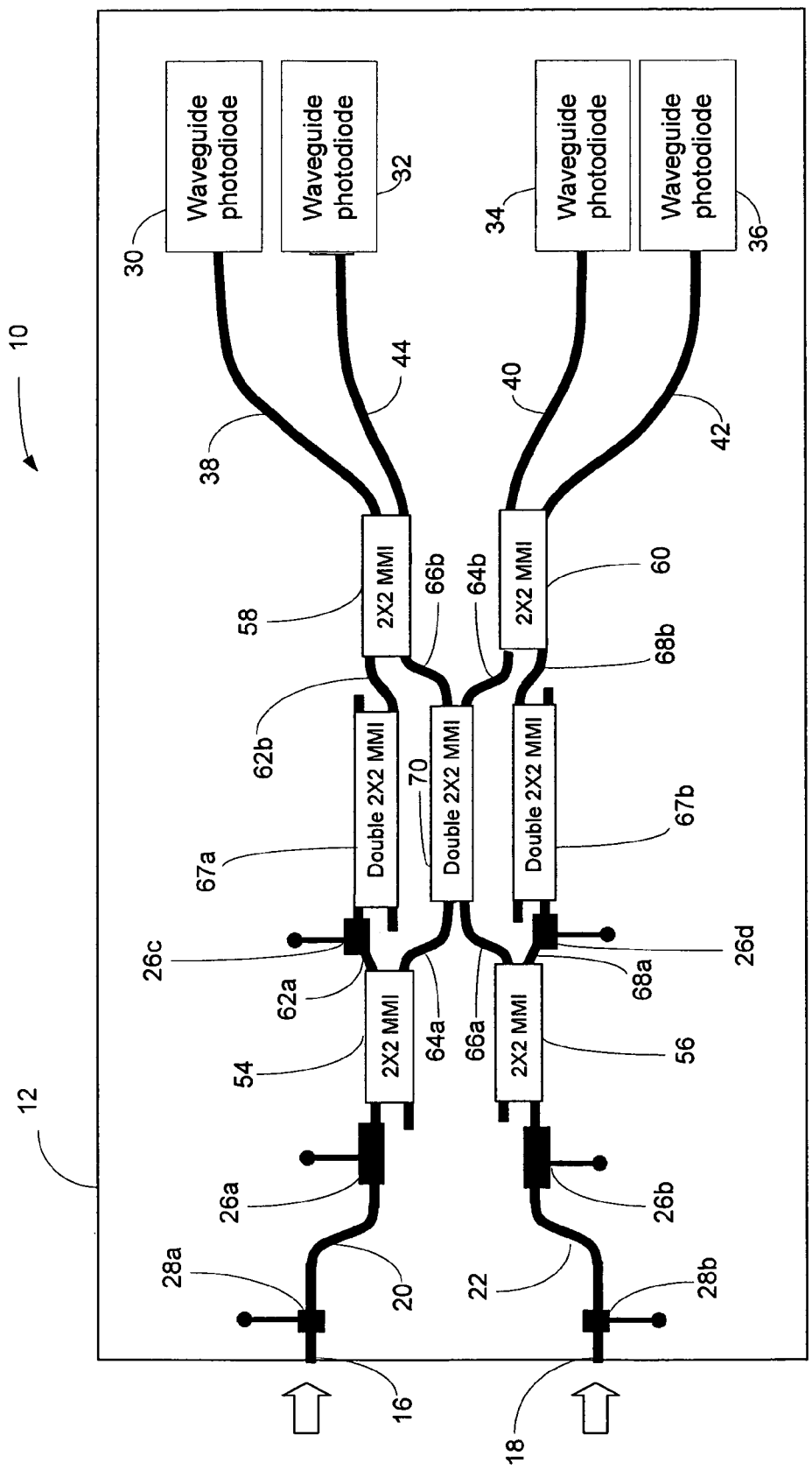
FIG. 8 is a schematic diagram of an exemplary DQPSK chip including symmetric inputs into a network of 2×2 MMI couplers with phase-control and a double-length 2×2 MMI coupler, dummy double-length 2×2 MMI couplers, and single-ended waveguide PIN photodiodes in accordance with the invention.

The hybrid-90 may be implemented as a network of symmetric 2×2 MMI couplers 54, 56, 58, 60 on the QPSK chip instead of as the above-described 4×4 MMI coupler 14. FIGS. 6-8 illustrate examples of a QPSK chip 10 of the instant invention including such network, with single-ended waveguide photodiodes 30, 32, 34, and 36 on each of the four outputs of the network. The chip 10 is designed so that waveguides 20 and 22 respectively couple the input ports 16 and 18 of the chip 10 to the 2×2 MMI couplers 54 and 56. The two waveguides 20 and 22 are coupled to separate specific inputs of the respective 2×2 MMI couplers 54 and 56. That is, the 2×2 MMI couplers 54 and 56 each include two inputs, and one of the inputs of each 2×2 MMI coupler 54 and 56 is respectively coupled to one of the waveguides 20 and 22 while the other input is unused.

Waveguides 62, 64, 66, and 68 (i.e., intermediate waveguides or optical channels) respectively couple the 2×2 MMI couplers 54 and 56 to 2×2 MMI couplers 58 and 60. The four separate optical paths which interconnect the MMIs 54 and 56 to the MMIs 58 and 60 are matched in length. This network of MMIs and waveguides also includes an optical waveguide cross-over 48 between I- and Q-channels. As illustrated in FIG. 6, the optical waveguide cross-over may be implemented as a simple waveguide cross-over 48 similar to the cross-overs 48 discussed in relation to FIG. 3. In this embodiment, dummy cross-overs are disposed along the path of each of waveguides 62 and 68. As illustrated in FIGS. 7 and 8, the optical waveguide cross-over may be implemented as a double-length 2×2 MMI coupler 70 which functions as a cross-over similar to the double-length 2×2 MMI couplers 52 discussed in relation to FIG. 4. As shown specifically in FIG. 8, dummy double-length 2×2 MMI couplers 67a and 67b may also be introduced along waveguides 62 and 68 to ensure that any excess losses are matched on all waveguides, thereby maintaining said functional optical symmetry.

Network phase electrodes 26c and 26d may be introduced along waveguides 62 and 68 in addition to the input phase electrodes 26a and 26b and auxiliary electrodes 28. These network phase electrodes 26c and 26d may be adjusted to introduce a 90° phase change between the I- and Q-channels.

Figure 9:
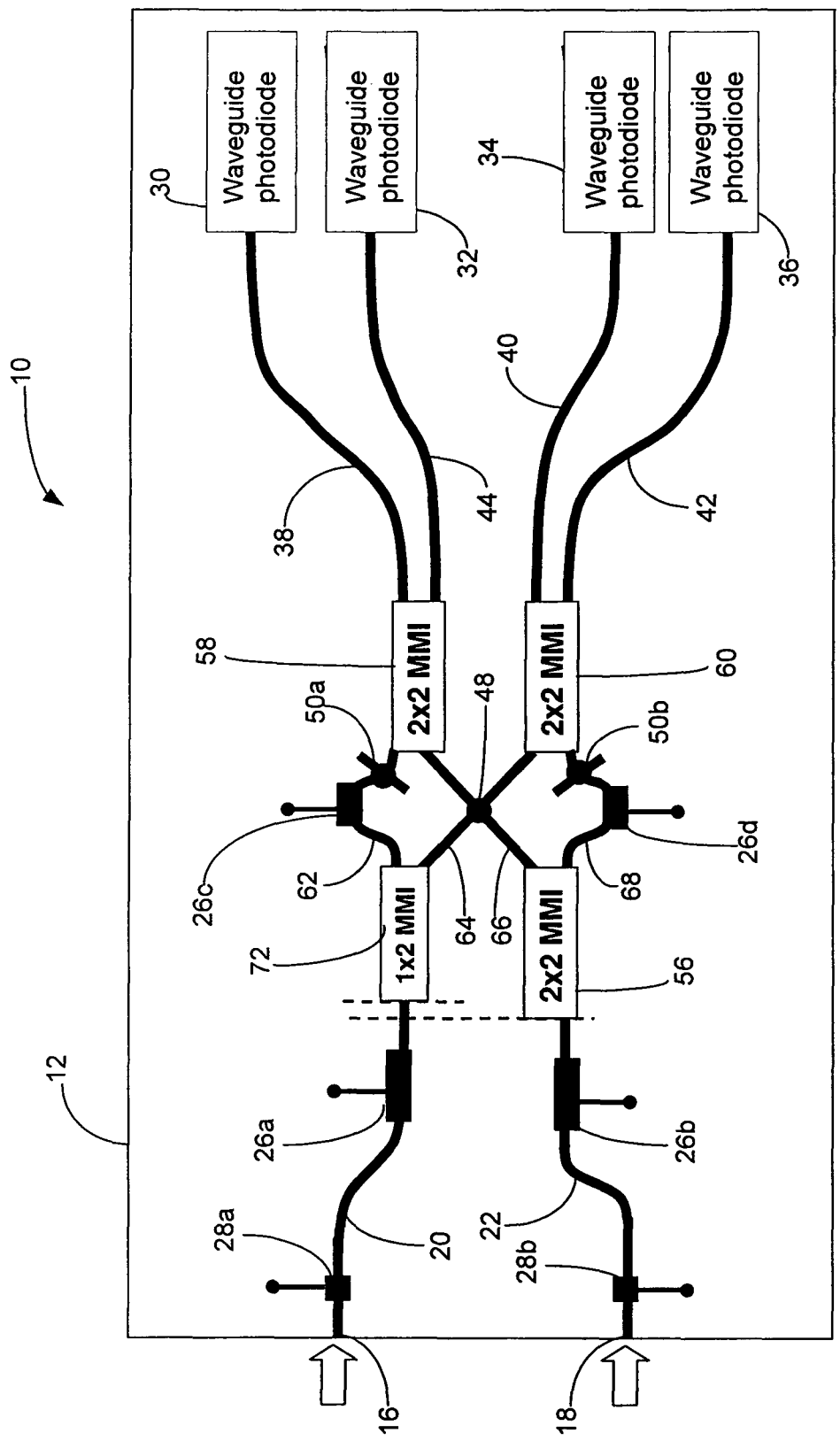
FIG. 9 is a schematic diagram of an exemplary QPSK chip including symmetric inputs into an asymmetric network of 1×2 and 2×2 MMI couplers with phase-control and waveguide cross-over, and single-ended waveguide PIN photodiodes in accordance with the invention.

This network of 2×2 MMIs couplers may be modified to include a 1×2 (symmetric interference) MMI coupler that performs the above-mentioned 90° phase change function. Specifically, FIG. 9 illustrates the use of a 1×2 MMI coupler 72 in place of 2×2 MMI coupler 54. The 1×2 MMI coupler 72 acts to introduce the 90° phase change between the I- and Q-channels in the network. Of course, the network phase electrodes 26c and 26d may still be included for making small corrections to the phase (as opposed to the full 90° phase change). As illustrated, the asymmetry in the lengths of the 2×2 MMI coupler 56 and the 1×2 MMI coupler 72 may be corrected by adjusting the length of waveguide 20 so as to give an optical path length which is equal to that of the input waveguide to the 2×2 MMI coupler 56. The asymmetry in the network may affect the balance of optical power in the output waveguides 38, 40, 42, 44. For example the insertion loss of 1×2 MMI coupler 72 may differ from that of 2×2 MMI coupler 56. For this reason, one or both of the dummy waveguides 50a and 50b may not be required and are therefore optional. In addition, the 2×2 MMI coupler 56 may be designed such that it has a deliberate imbalance in its output power into waveguides 66 and 68 to offset such asymmetry. Of course, the optical waveguide cross-over 48 (and dummy cross-overs 50) may instead be implemented as a double-length 2×2 MMI coupler 70 (and dummy double-length 2×2 MMI couplers 67), similar to the embodiment of FIGS. 7 and 8.

Conventional approaches of introducing a 90° phase offset include adjustment of the length of one of the network waveguides by $\Delta Z$. This results in a phase change $\Delta \Phi = 2\pi n \Delta Z / \lambda$ radians (where n is the waveguide propagation modal index of the optical signal with wavelength $\lambda$ in free-space). The length $\Delta Z$ is designed such that $\Delta \Phi = \pi/2$ radians at a specific wavelength of operation. The difficulty with this approach is that this phase-change will change with wavelength, due to both the direct inverse-wavelength dependence and because of any dispersion effects in the modal propagation index. In addition the modal propagation index has some temperature dependence, particularly in the case of semiconductor waveguides. So the phase-offset will also change with temperature of operation.

Another conventional approach of introducing a 90° phase offset includes trimming the propagation index of one of the network waveguides (e.g. by adjusting the waveguide width, or material properties) or by trimming the waveguide material properties then $\Delta \Phi = 2\pi \Delta n Z / \lambda$. However, there is still a wavelength dependence, and possible wavelength and temperature dependency of the adjustment $\Delta n$.

Still another conventional approach of introducing a 90° phase offset includes adding a phase-control electrode to one or more of the network waveguides. However, the setting of this phase-control may need to be fixed over wavelength and temperature, which is difficult to accomplish. One commonly used method is to use a resistive heater on or close to the waveguide to increase its temperature locally by a controlled amount $\Delta T$. This modifies the waveguide modal propagation index n through its temperature dependence, so that a refractive index change $\Delta n = n(T+\Delta T) - n(T)$ can be achieved (where T is the temperature of the other waveguides in the network). One disadvantage is that the value of $\Delta n$ may have a wavelength dependence, due to differences in the temperature dependence of the optical properties of the materials used to construct the waveguide. Secondly, if the optical hybrid is required to function over a range of temperatures T, then the phase-control needs to be adapted according to the operating temperature T. The reason being that n(T) will not in general have a purely linear dependence on temperature, and more importantly the local heating achieved in the waveguide, $\Delta T$, depends upon both the dissipated power in the resistor and the thermal conductivities of the materials which comprise the waveguide. Any temperature dependence of these properties will result in a different heating effect, $\Delta T$, as the operating temperature is changed. Other methods include modifying the refractive index of the waveguide core through either the application of a forward-bias (so as to introduce a controlled density of carriers into the waveguide core) or a reverse-bias (so as to introduce a controlled electric field into the waveguide core). This method has a phase-dependence which is dependent upon the wavelength of operation.

In the embodiment of FIG. 9, the phase-relationships of the input and output ports of the 1×2 MMI coupler 72 and 2×2 MMI coupler 56 are fixed by their design. Also, there is a range of operation over which the MMI design is tolerant to changes in wavelength and temperature. By utilising the difference in the intrinsic input/output phase-relationship of 1×2 and 2×2 MMI couplers, rather than modifying the phase within the waveguide network, improved stability of performance over a wider range of wavelength and temperature operating conditions is achieved. Furthermore, the network of FIG. 9 has the advantage of minimizing the impact of any polarization dependence associated with either or both of the network phase controls 26c and 26d.

Figure 10:
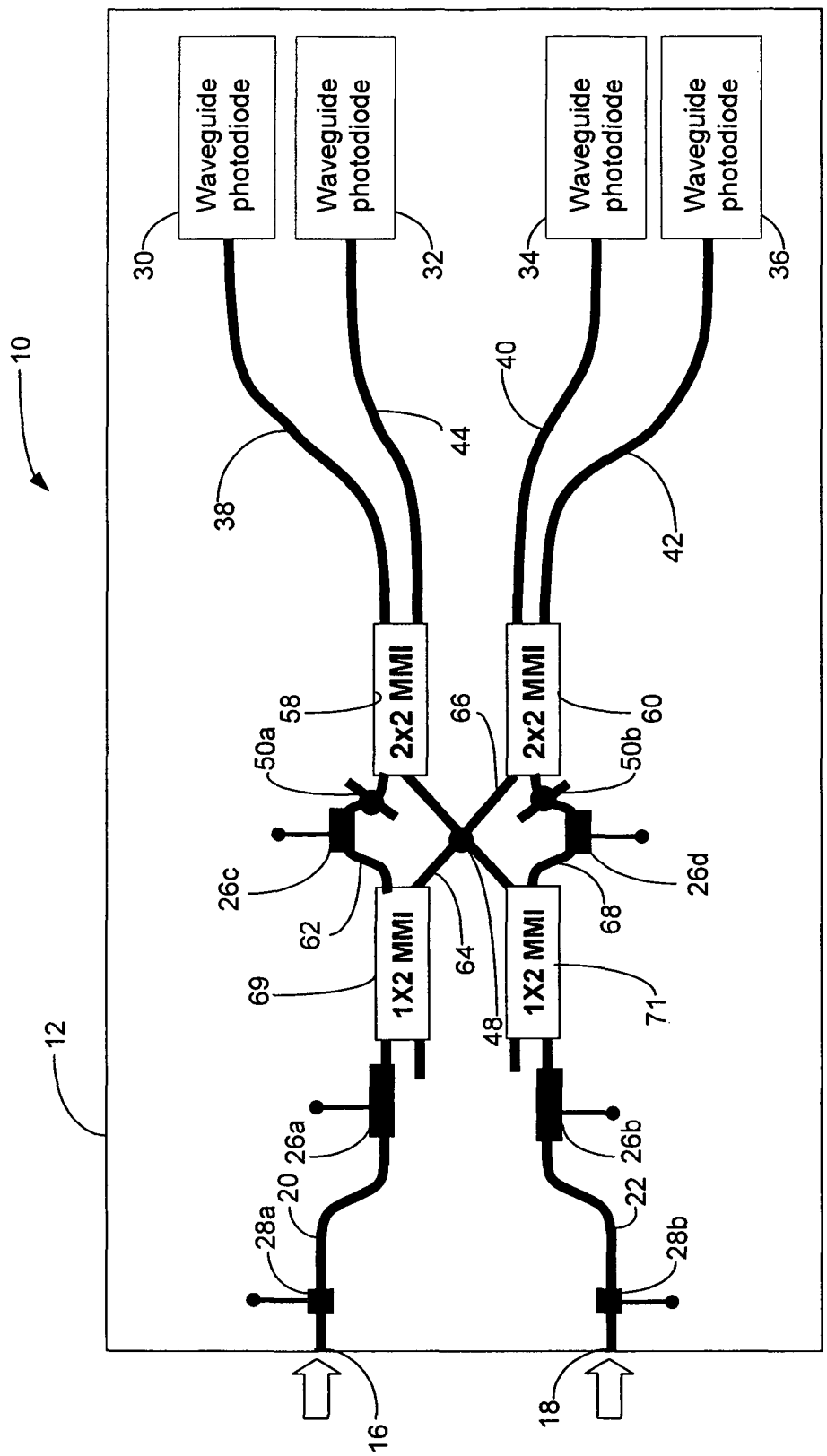
FIG. 10 is a schematic diagram of an exemplary QPSK chip including symmetric inputs into a network of 1×2 and 2×2 MMI couplers with phase-control and waveguide cross-over, dummy-waveguide cross-overs, and single-ended waveguide PIN photodiodes in accordance with the invention.

As illustrated in FIG. 10, the above-discussed network of 2×2 MMI couplers 54, 56, 58, and 60 may also be modified so that 2×2 MMI couplers 54 and 56 are replaced by 1×2 MMI couplers 69 and 71. Such modified network can provide an advantage of improved split-ratio process tolerance.

Figure 11:
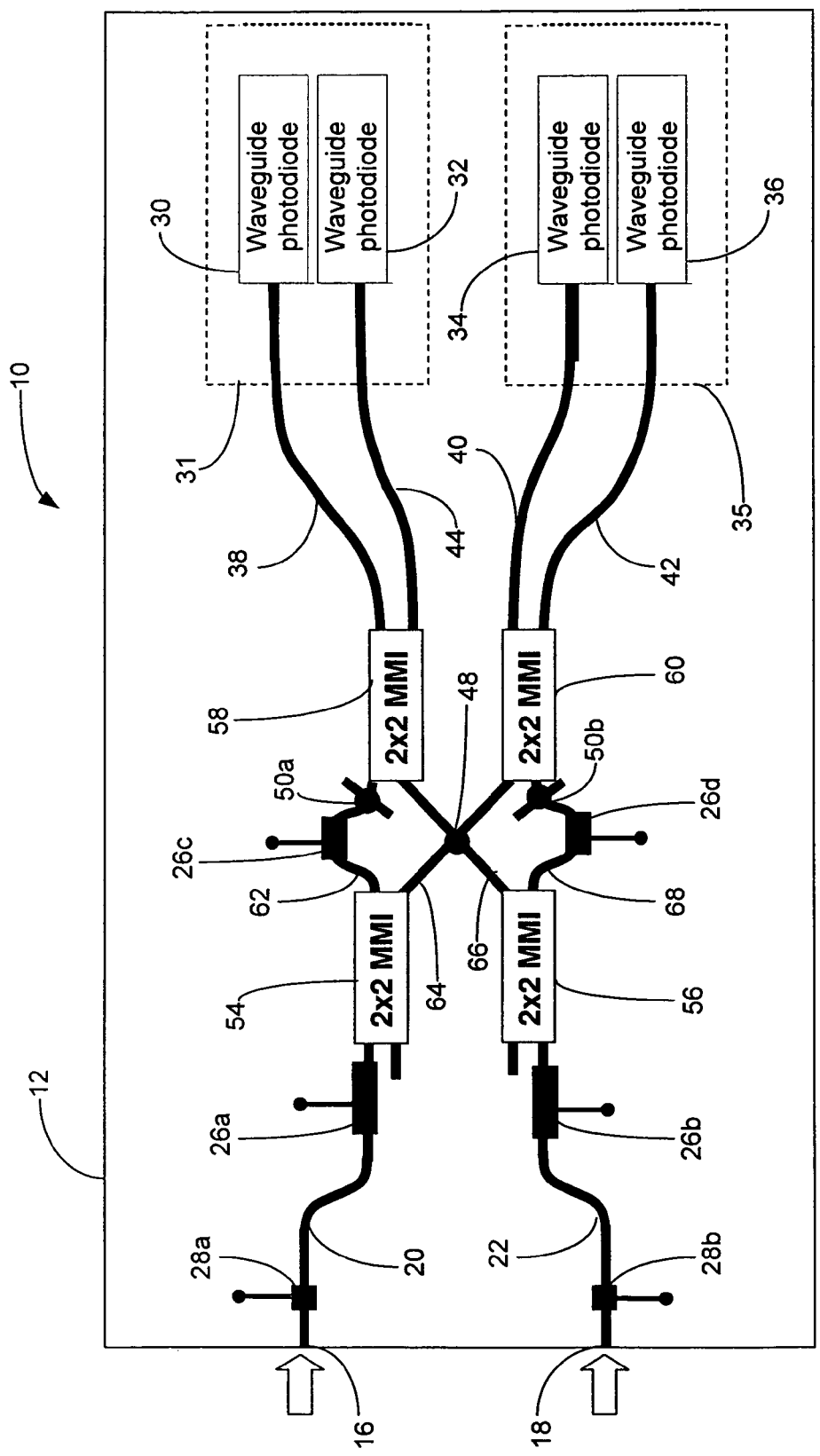
FIG. 11 is a schematic diagram of an exemplary QPSK chip including symmetric inputs into a network of 2×2 MMI couplers with phase-control and waveguide cross-over, dummy-waveguide cross-overs, and balanced waveguide PIN photodiodes for differential detection on the chip in accordance with the invention.
Figure 12:
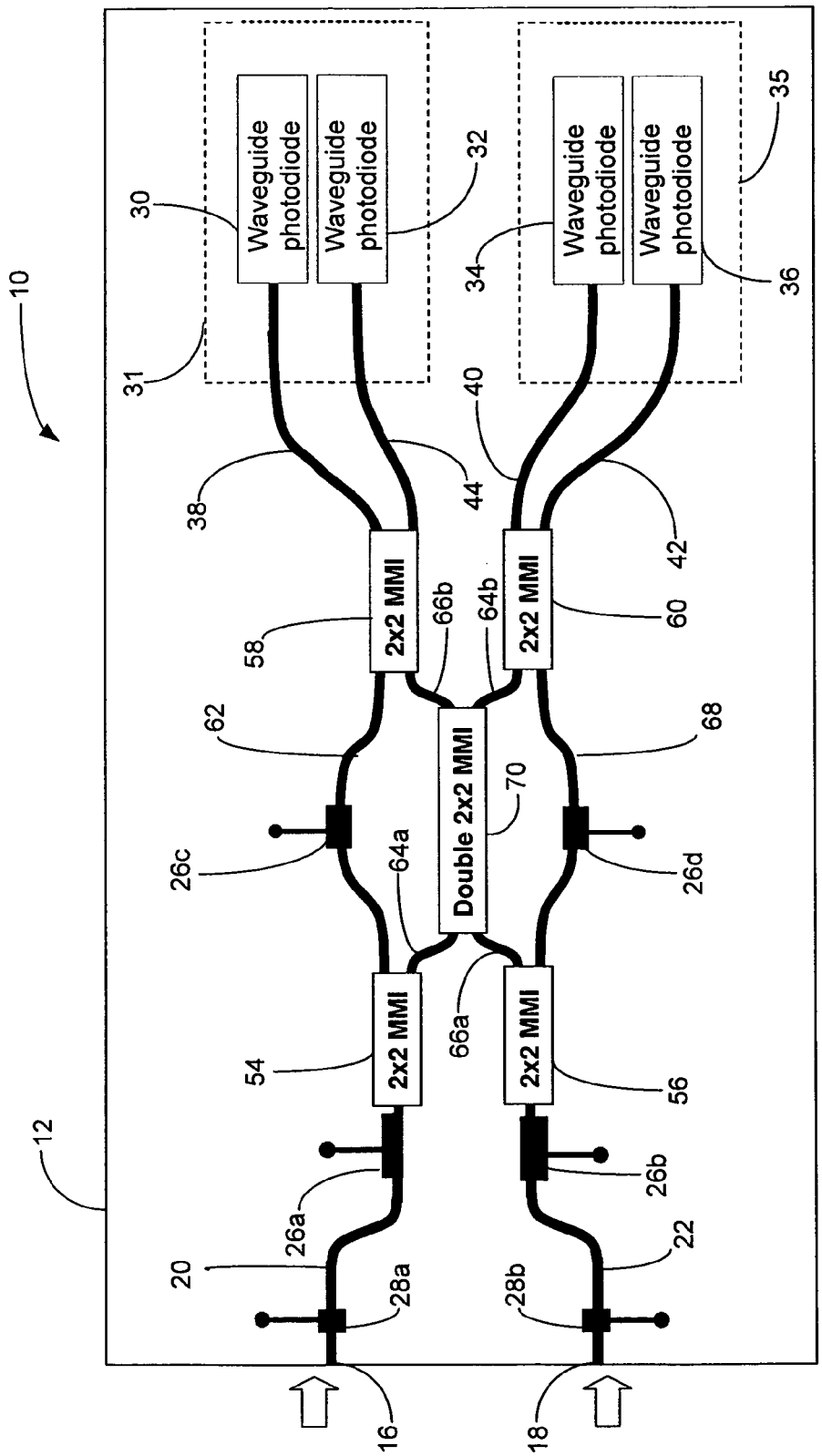
FIG. 12 is a schematic diagram of an exemplary QPSK chip including symmetric inputs into a network of 2×2 MMI couplers with phase-control and a double-length 2×2 MMI coupler, and balanced waveguide PIN photodiodes for differential detection on the chip in accordance with the invention.

FIGS. 11 and 12 illustrate examples of QPSK chips 10 of the instant invention based upon a network of 2×2 MMIs 54, 56, 58, and 60 acting as 3 dB couplers in a manner similar to that discussed in relation to FIGS. 7 and 8, with dummy waveguide cross-overs, and with two pairs of balanced waveguide photodiodes 31 and 35.

Figure 13:
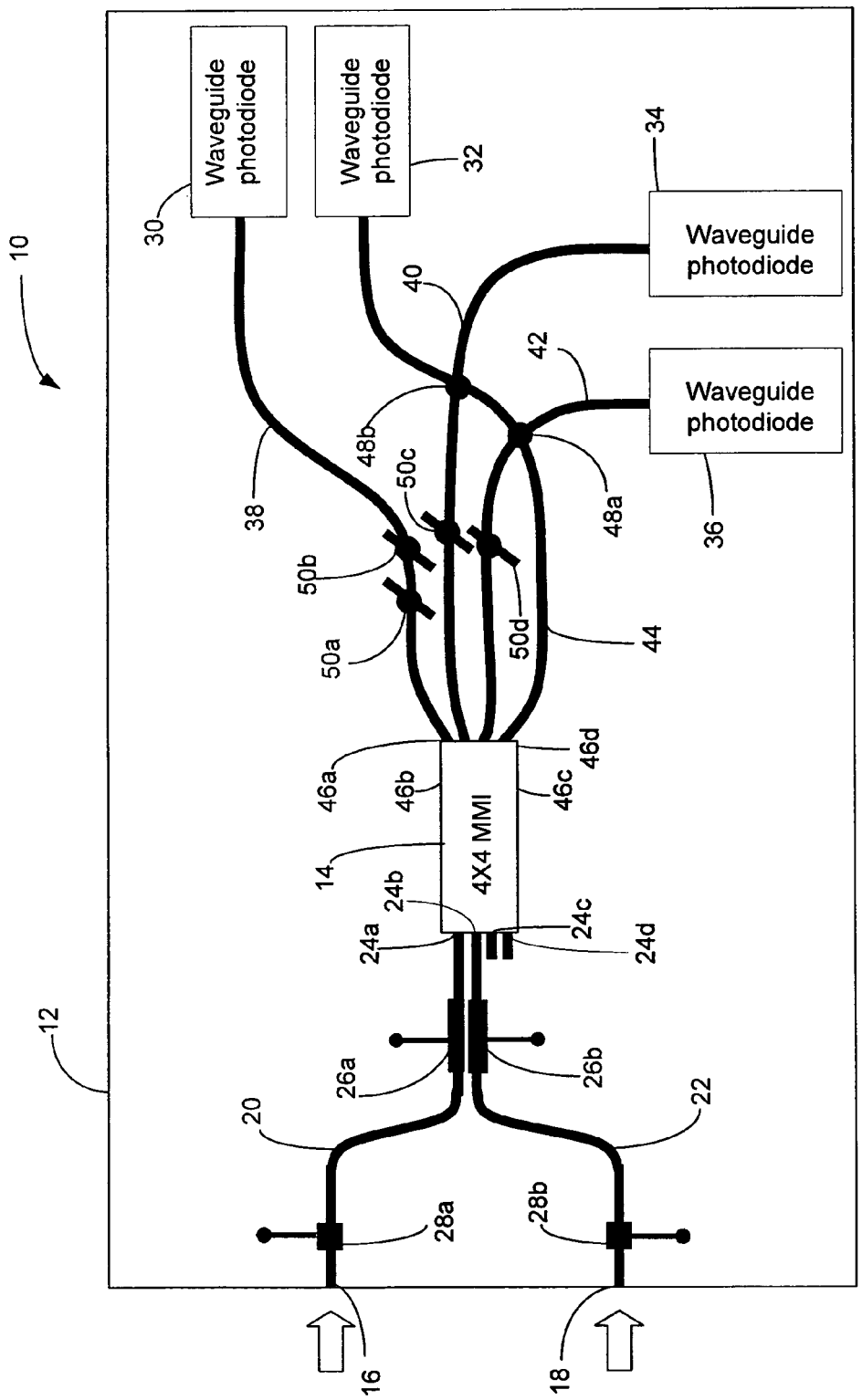
FIG. 13 is a schematic diagram of an exemplary QPSK chip including symmetric inputs into a 4×4 MMI coupler, waveguide crossovers to re-order the outputs, and single-ended waveguide PIN photodiodes arranged on different sides of the chip, so as to facilitate coupling to two separate TIAs in accordance with the invention.

FIG. 13 illustrates an example of the QPSK chip 10 of the instant invention, wherein the configuration of the chip is designed to meet the requirement to couple to two separate TIAs (not illustrated). Waveguides 38, 40, 42, and 44 include cross-overs similar to those discussed in relation to FIG. 3. Photodiode pairs 30 and 32; 34 and 36 are located on two adjacent sides of the chip 10 rather than on the same side. Of course, other configurations are possible (e.g., all on the same side, on opposite sides of the chip, etc.).

Figure 14:
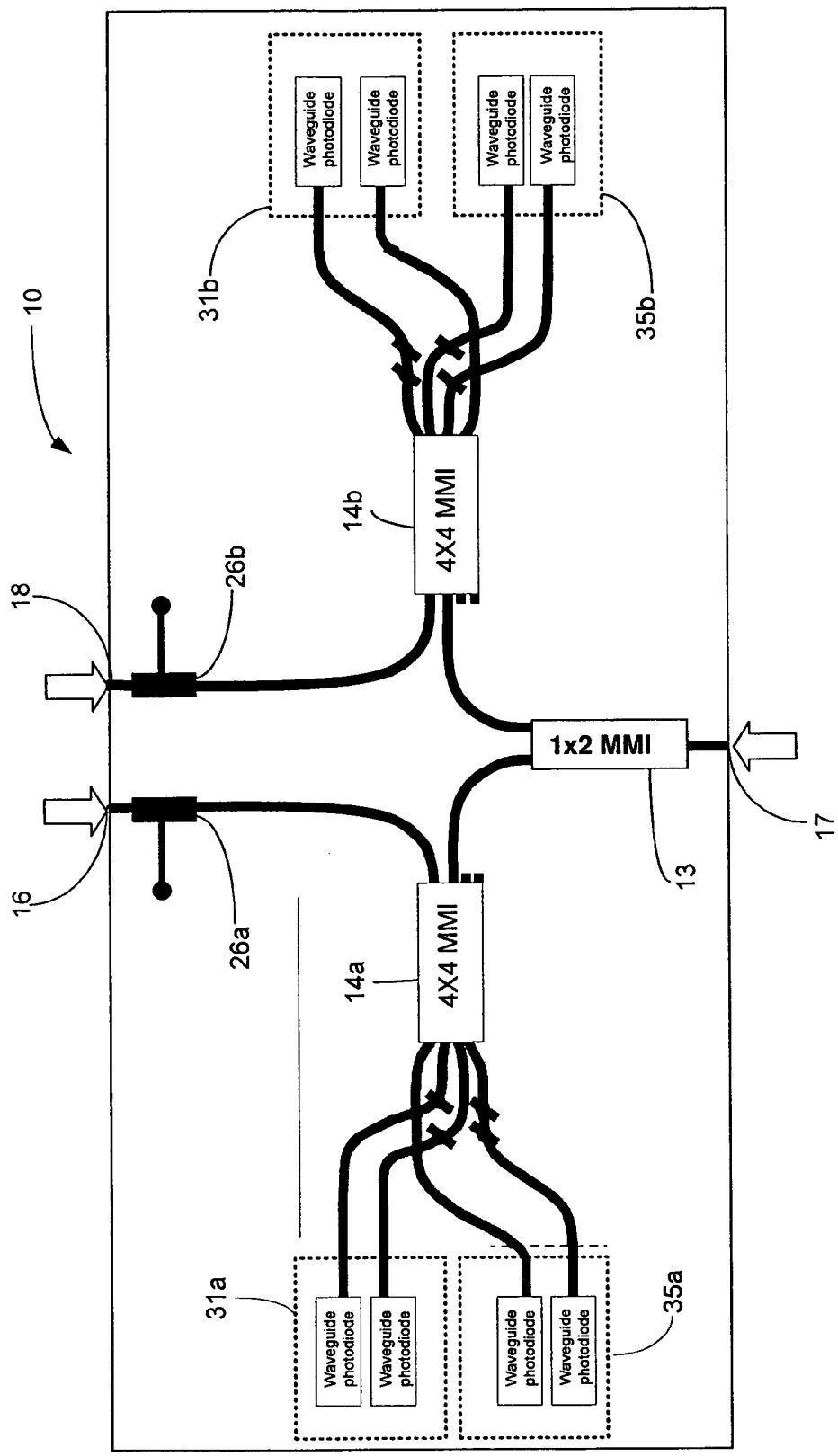
FIG. 14 is a schematic diagram of an exemplary PDM-QPSK chip for coherent detection, including one optical input for the local oscillator (LO) and two optical inputs corresponding to the two polarization components of the encoded data signal, rotated into a common polarization state which is the same as that of the LO, in accordance with the invention.

FIG. 14 illustrates an example of a chip 10 of the instant invention with integrated balanced waveguide photodiodes 31 and 35 for use in a PDM-QPSK demodulator. In this case the input signal is in QPSK format for two different orthogonal polarization states. As illustrated, the input signal is split into the two separate polarization components off-chip, and one of these is rotated into the common single state of polarization used on the chip. The chip therefore has two optical signal input ports 16 and 18, and also an input port 17 for a LO signal which provides the reference phase for decoding the phase-shift data encoded on the two QPSK signals. The input port 17 is coupled to a 1×2 MMI coupler 13, which in turn is coupled to 4×4 MMI couplers 14a and 14b and with provision of dummy waveguide cross-overs. Of course, the chip illustrated in FIG. 13 could be alternatively designed using any of the foregoing chip designs, and/or with single-ended photodiodes 30, 32, 34, and 36.

Optical Delay

Optical delay of the QPSK signal that may be used in conjunction with the QPSK chips 10 of the present invention, and is performed off-chip using low-birefringence and high thermal stability optical glass. Specifically, the optical delay may be constructed as an optical block which splits the optical input signal into two signals and delaying one of the two split signals by one bit period or by a period plus or minus a fraction of a bit period. The delayed and undelayed output signals from the optical delay may be respectively coupled to the inputs of the QPSK chip 10 of the present invention. Furthermore, this delay can be variable in length. The optical delay can be adjusted by adjustment of the optical block.

Performing optical delay off-chip overcomes the disadvantages associated with having a limited amount of control of the on-chip optical delay, while providing for relatively easy customization of the delay period to suit individual requirements. In accordance with the present invention, the same QPSK chip can be used with any one of a plurality of off-chip optical delays, and vice versa.

Figure 15:
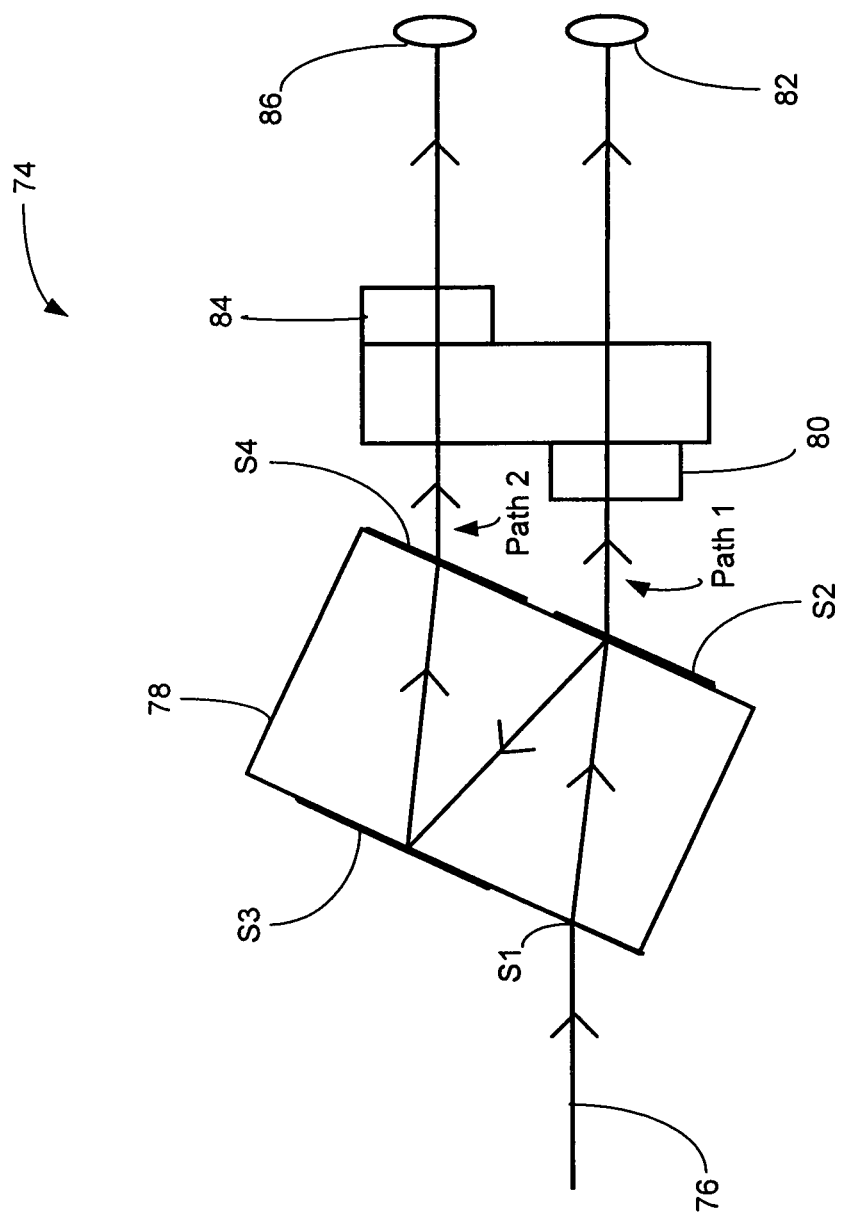
FIG. 15 is a schematic diagram of the principles of operation of the optical delay system in accordance with the invention.

FIG. 15 illustrates of the principles of operation of the optical delay system 74. An input light beam 76 is incident on an optical block 78 at S1 and is refracted to point S2 where it is split. Specifically, about 50% of the beam 76 is transmitted and about 50% of the beam 76 is reflected. The transmitted beam 76 continues along path 1 through one or more lenses 80, 82 to an input port on the chip (not illustrated). The beam 76 reflected at S2 is further reflected at S3 and leaves the block at S4 from where it continues along path 2 through one or more lenses 84 and 86 to a separate input port on the chip. The lenses direct the beams along paths 1 and 2 into the respective waveguides on the chip. The optical path difference (which determines the optical delay) and separation of the two beams will be dependent upon the thickness of the block 78 and the angle of incidence to the input light beam 76. The delay and separation will also be dependent upon the refractive index of the optical block 78. The reflective properties of the facets of the block are determined by applying anti-reflective (AR) coatings at S1 and S4, applying a 50% reflective coating at S2 and a 100% reflective coating at S3.

The optical block system in accordance with the invention may further include a tunable delay 88. The tunable delay 88 may be made of a material such as silicon, which when heated in a controlled way, can trim the optical path over a fraction of a bit period.

Figure 16:
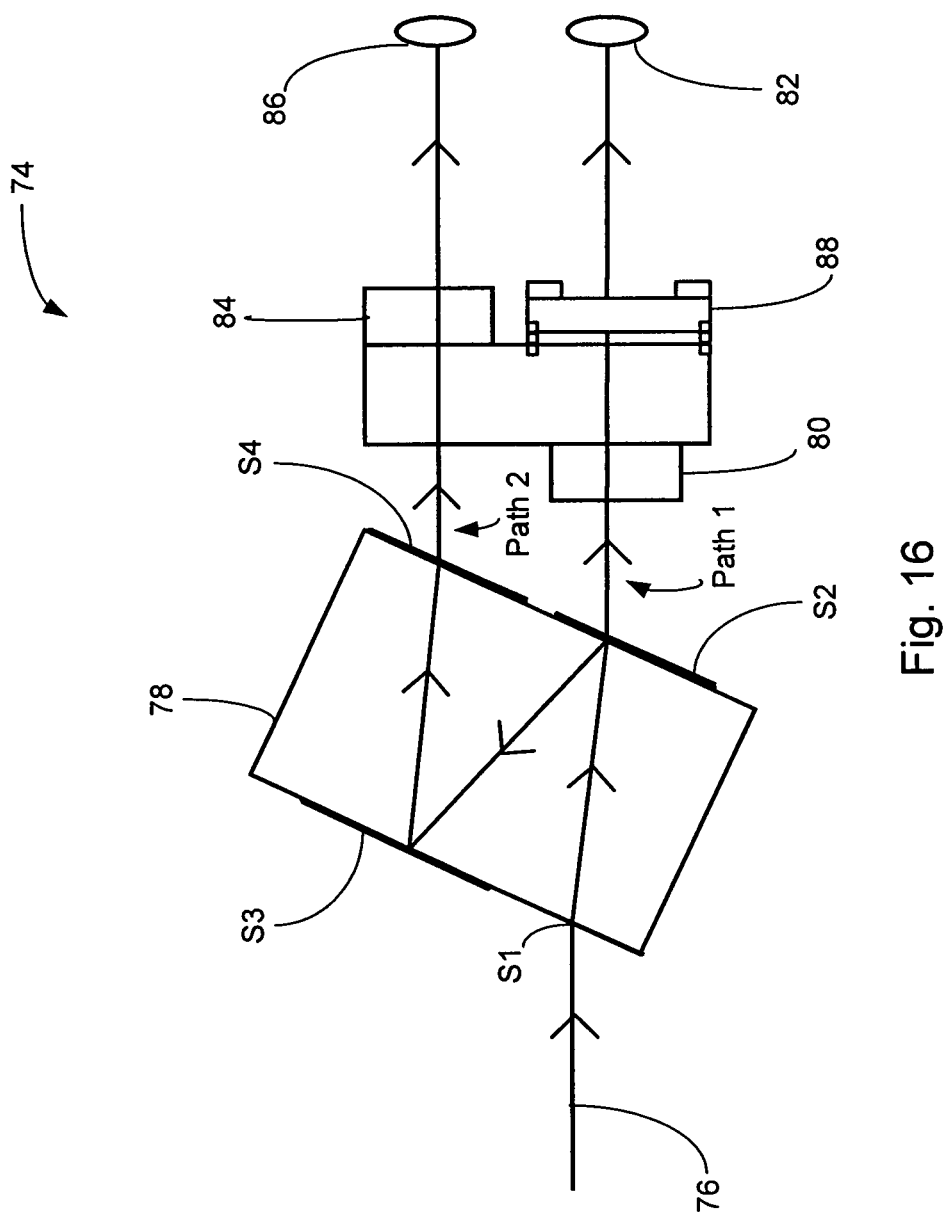
FIG. 16 is a schematic diagram of a first embodiment of the optical block delay incorporating a thermally tunable delay in accordance with the invention.

FIG. 16 illustrates an embodiment of the optical delay system which incorporates the thermally tunable delay 88 in one of the output optical paths between the optical block 78 and the chip.

Figure 17:
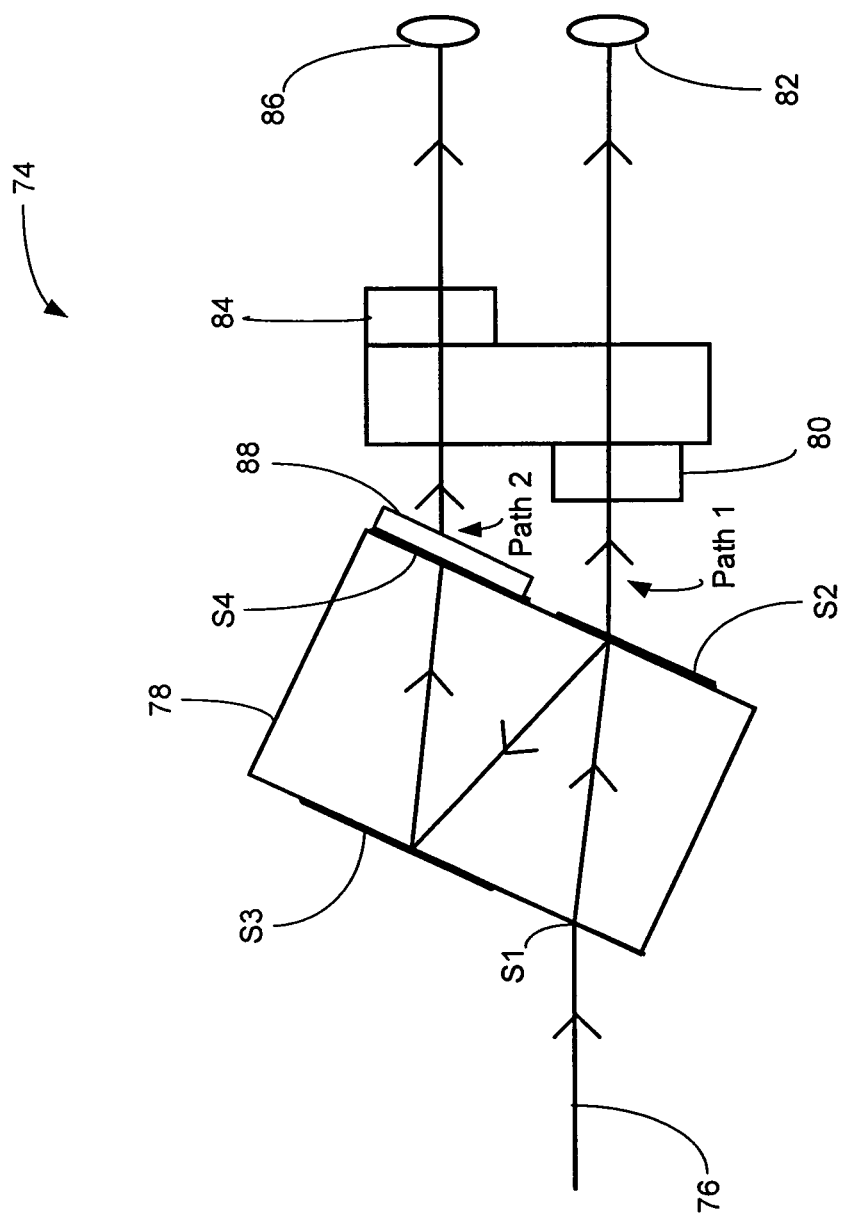
FIG. 17 is a schematic diagram of a second embodiment of the optical block delay incorporating a thermally tunable delay in accordance with the invention.

FIG. 17 illustrates an embodiment of the optical delay system which incorporates the thermally tunable delay 88 on the optical block 78 (e.g., at S4) rather than, as in FIG. 16, to the lenses.

Figure 18:
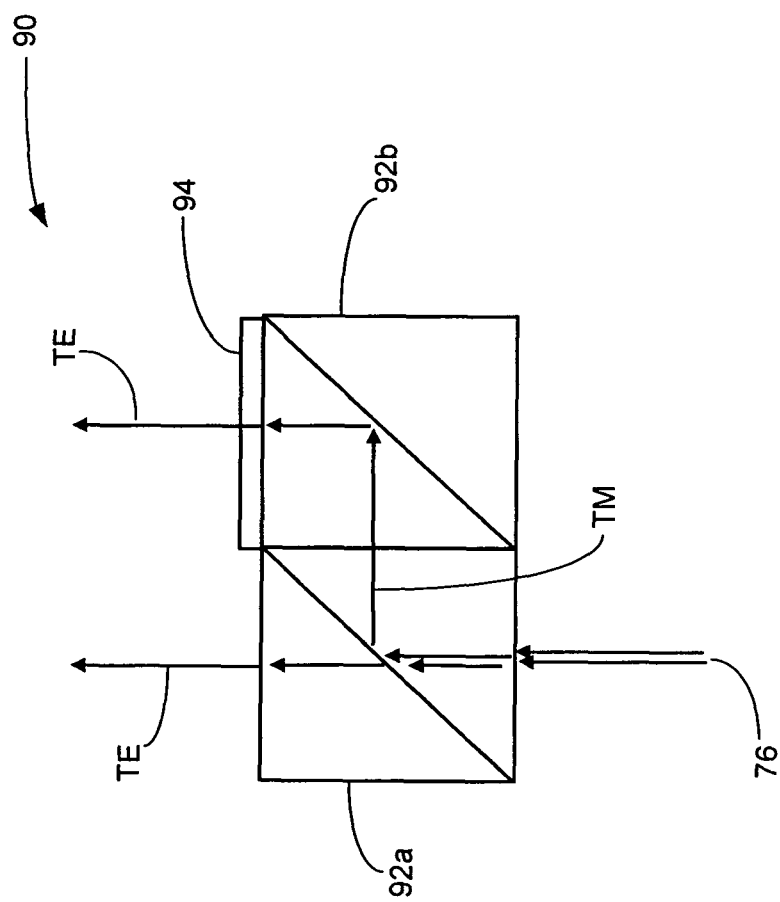
FIG. 18 is a schematic diagram of a polarization beam splitter that can be used to provide the optical input to the chip when the optical signal is PDM-QPSK coded in accordance with the invention.

FIG. 18 illustrates an optical element 90 that can be used when polarization diversity is desired. It consists of two polarization beam splitters 92 (PBS) and a half-wave plate 94, the dimensions of the PBS cube are used to effect beam separation. The device takes a beam 77 of input light (including TE and TM polarizations, splits it into TE and TM polarizations, and convert the TM beam to TE so that the two TE beams are applied to the optical receiver chip. Alternatively, two TM beams may similarly be produced and applied to the optical receiver chip.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A QPSK chip for demodulating an optical signal, including:
    an input configured to receive a plurality of input signals including a first input signal and a second input signal, wherein at least one of the first input signal and the second input signal is a QPSK modulated signal;
    an optical hybrid mixer configured to receive the input signals from the input and mix the input signals to generate a plurality of output signals including at least one I-channel signal and at least one Q-channel signal, the optical hybrid mixer including an asymmetrical network of MMI couplers that includes:
        a first 2×2 MMI cross coupler configured to receive the first input signal and split the first input signal into a first intermediate signal and a second intermediate signal, the first intermediate signal and the second intermediate signal being 90 degrees out of phase relative to each other;
        a 1×2 MMI coupler configured to receive the second input signal from the input and split the second input signal into a third intermediate signal and a fourth intermediate signal, the 1×2 MMI coupler using symmetric interference to cause the third intermediate signal and the fourth intermediate signal to be in-phase relative to each other;
        a second 2×2 MMI cross coupler configured to receive the first and third intermediate signals, and mix the first and third intermediate signals to generate the at least one I-channel signal; and
        a third 2×2 MMI cross coupler configured to receive the second and fourth intermediate signals, and mix the second and fourth intermediate signals to generate the at least one Q-channel signal, the at least one I-channel signal and the at least one Q-channel signal are 90 degrees out of phase relative to each other;
    a plurality of photodiodes, each detecting a corresponding one of the plurality of output signals; and
    a plurality of output waveguides, each coupling one of the plurality of photodiodes to a respective output of the optical hybrid mixer corresponding to one of the plurality of output signals.

2. The QPSK chip according to claim 1, wherein the 1×2 MMI coupler includes a plurality of outputs;
    the first 2×2 MMI coupler includes a plurality of outputs; and
    a plurality of intermediate waveguides couple the respective outputs of the 1×2 MMI coupler and the first 2×2 MMI coupler to respective inputs of the second 2×2 MMI coupler and the third 2×2 MMI coupler.

3. The QPSK chip according to claim 2, further including a cross-over between at least two of the plurality of intermediate waveguides.

4. The QPSK chip according to claim 1, wherein the first 2×2 MMI coupler is designed such that it has a deliberate imbalance in its output power.

5. The QPSK chip according to claim 3, wherein the optical hybrid mixer includes at least one dummy waveguide cross-over included along one of the plurality of intermediate waveguides to balance at least one of insertion loss and birefringence among the plurality of intermediate waveguides, and the at least one dummy waveguide cross-over balances an imbalance due to the cross-over between at least two of the plurality of intermediate waveguides.

6. The QPSK chip according to claim 2, wherein the optical hybrid mixer includes a MMI cross-coupler included along at least two of the plurality of intermediate waveguides to cross-over the at least two of the plurality of intermediate waveguides and balance at least one of insertion loss and birefringence among the plurality of intermediate waveguides.

7. The QPSK chip according to claim 1, wherein the input is coupled to an off-chip delay unit that splits and delays the QPSK modulated signal.

8. The QPSK chip according to claim 1, wherein the first input signal is the QPSK modulated signal and the second input signal is from a local oscillator.

9. The QPSK chip according to claim 1, wherein the first input signal is from a local oscillator and the second input signal is the QPSK modulated signal.

10. The QPSK chip according to claim 1, wherein the first input signal is a first portion of the QPSK modulated signal and the second input signal is a second portion of the QPSK modulated signal that is phase shifted relative to the first portion of the QPSK modulated signal.

\* \* \* \* \*